US012305839B2

(12) United States Patent
Deng et al.

(10) Patent No.: US 12,305,839 B2
(45) Date of Patent: May 20, 2025

(54) MAGNETICALLY-ADSORBED CONDUCTIVE TRACK, ADAPTER, ELECTRICAL APPARATUS, AND ELECTRICAL SYSTEM

(71) Applicants: OPPLE LIGHTING CO., LTD., Shanghai (CN); SUZHOU OPPLE LIGHTING CO., LTD., Suzhou (CN)

(72) Inventors: Shitao Deng, Suzhou (CN); Yu Mao, Suzhou (CN); Xin Dai, Suzhou (CN); Shuangzeng Li, Suzhou (CN); Yaohai Wang, Suzhou (CN); Ji Ma, Suzhou (CN)

(73) Assignees: Opple Lighting Co., Ltd., Shanghai (CN); Suzhou Opple Lighting Co., Ltd., Suzhou (CN)

( * ) Notice: Subject to any disclaimer, the term of this patent is extended or adjusted under 35 U.S.C. 154(b) by 473 days.

(21) Appl. No.: 17/565,063

(22) Filed: Dec. 29, 2021

(65) Prior Publication Data

US 2022/0120421 A1 Apr. 21, 2022

Related U.S. Application Data

(63) Continuation of application No. PCT/CN2020/127011, filed on Nov. 6, 2020.

(30) Foreign Application Priority Data

Nov. 8, 2019 (CN) ......................... 201911086105.2
Nov. 8, 2019 (CN) ......................... 201911086107.1
(Continued)

(51) Int. Cl.
*F21V 21/35* (2006.01)
*F21S 8/04* (2006.01)
(Continued)

(52) U.S. Cl.
CPC ................ *F21V 21/35* (2013.01); *F21S 8/04* (2013.01); *H01R 25/14* (2013.01); *H01R 31/06* (2013.01)

(58) Field of Classification Search
None
See application file for complete search history.

(56) References Cited

U.S. PATENT DOCUMENTS

2013/0065414 A1 3/2013 Yu et al.

FOREIGN PATENT DOCUMENTS

CN 201599752 U 10/2010
CN 103001044 A 3/2013
(Continued)

OTHER PUBLICATIONS

International Search Report of PCT Application No. PCT/CN2020/127011 dated Feb. 10, 2021 with English translation, (6p).

*Primary Examiner* — Ross N Gushi
(74) *Attorney, Agent, or Firm* — Arch & Lake LLP

(57) ABSTRACT

The present disclosure discloses a magnetically-adsorbed conductive track, a magnetically-adsorbed conductive track system and an electrical system in the field of lighting technology. The electrical system includes: at least two magnetically-adsorbed conductive tracks, at least one electrical apparatus and at least one adapter; the adapter cascades at least two magnetically-adsorbed conductive tracks. The magnetically-adsorbed conductive track includes: a main body portion including an adsorbing wall and a mounting wall; and an insulating portion and a magnetic element arranged in the main body portion; the insulating portion includes: a second space in communication with the adsorbing wall, and a first space which accommodates a conductive portion and is in communication with the second space; an elastic conductive terminal of the electrical apparatus and a
(Continued)

collocating portion are jointly collocated into the second space of the magnetically-adsorbed conductive track.

20 Claims, 36 Drawing Sheets

(30) Foreign Application Priority Data

Nov. 8, 2019 (CN) ........................ 201911086264.2
Nov. 8, 2019 (CN) ........................ 201921918384.X
Nov. 8, 2019 (CN) ........................ 201921918669.3
Nov. 8, 2019 (CN) ........................ 201921918697.5

(51) Int. Cl.
*H01R 25/14* (2006.01)
*H01R 31/06* (2006.01)

(56) References Cited

FOREIGN PATENT DOCUMENTS

| | | | |
|---|---|---|---|
| CN | 203500965 | U | 3/2014 |
| CN | 207555323 | U | 6/2018 |
| CN | 207750854 | U | 8/2018 |
| CN | 207853525 | U | 9/2018 |
| CN | 108826114 | A | 11/2018 |
| CN | 208779208 | U | 4/2019 |
| CN | 110768074 | A | 2/2020 |
| CN | 110778995 | A | 2/2020 |
| CN | 110854638 | A | 2/2020 |
| JP | 2009140669 | A | 6/2009 |

MAGNETICALLY-ADSORBED CONDUCTIVE TRACK, ADAPTER, ELECTRICAL APPARATUS, AND ELECTRICAL SYSTEM

CROSS-REFERENCE TO RELATED APPLICATIONS

This application is based upon and claims the priority of PCT patent application No. PCT/CN2020/127011 filed on Nov. 6, 2020 which claims priority to the Chinese patent application No. 201911086105.2 filed on Nov. 8, 2019, the Chinese patent application No. 201921918697.5 filed on Nov. 8, 2019, the Chinese patent application No. 201911086264.2 filed on Nov. 8, 2019, the Chinese patent application No. 201921918384.X filed on Nov. 8, 2019, the Chinese patent application No. 201911086107.1 filed on Nov. 8, 2019, and the Chinese patent application No. 201921918669.3 filed on Nov. 8, 2019, the entire contents of which are hereby incorporated by reference herein for all purposes.

TECHNICAL FIELD

The present disclosure relates to the field of lighting technology, and more particularly, to a magnetically-adsorbed conductive track, an adapter, an electrical apparatus and an electrical system.

BACKGROUND

A track lamp mainly includes a track (a conductive track) fixed on a ceiling or a wall and various lamps that can slide along the track, such as spot lamps, line lamps, and the like.

The track usually has a certain height or thickness. On the basis of some instances, the track still has certain rooms for improvement, for example, it may be lighter and thinner with lower cost.

In addition, a cascaded structure of the track also has room for improvement, for example, it may be lighter and thinner, smaller in thickness, and achieve a smooth, efficient, and fast connection.

SUMMARY

The present disclosure provides a magnetically-adsorbed or magnetically-attracted conductive track, a magnetically-adsorbed conductive track system and an electrical system. In the present disclosure, "magnetically-adsorbed" is used interchangeably with "magnetically-attracted."

According to the first aspect, it provides an electrical system. The electrical system may include: at least two magnetically-adsorbed conductive tracks, at least one electrical apparatus and at least one adapter; the at least one adapter cascades the at least two magnetically-adsorbed conductive tracks; the magnetically-adsorbed conductive track includes a main body portion extending along a length direction and having a flat shape, the main body portion includes: an adsorbing wall or attraction wall, a mounting wall arranged opposite to the adsorbing wall, a pair of side walls connecting the adsorbing wall and the mounting wall, and a pair of partition walls parallel to the side walls and located between the side walls; the side walls and the partition walls, respectively, together with the adsorbing wall and the mounting wall, form conductive grooves extending in the length direction and located at both sides, and form an accommodating space located between the conductive grooves; a slot is formed in a direction from the adsorbing wall towards the mounting wall and is in communication with the conductive grooves; a pair of insulating portions, each accommodated in the conductive groove and provided with an accommodating portion in communication with the slot of the adsorbing wall; a pair of conductive portions, each accommodated in the accommodating portion of the insulating portion; and a magnetic element, accommodated in the accommodating space and attached to the adsorbing wall. In the present disclosure, "adsorbing wall" is used interchangeably with "attraction wall."

The insulating portion is attached inside the conductive groove; and the accommodating portion of the insulating portion includes: a first space for accommodating the conductive portion, and a second space which is in communication with the first space and is smaller than the first space, allowing a conductor of a lamp to enter the first space from the second space to be electrically connected with the conductive portion; the electrical apparatus includes: a main body formed by extending along a longitudinal direction, an electrical connection module collocated with the main body, and a magnet module; the electrical connection module includes: a housing body formed by extending along the longitudinal direction, an elastic conductive terminal accommodated in the housing body, and a collocating portion provided on a surface of the housing body that faces the magnetically-adsorbed conductive track and extending in the longitudinal direction; the elastic conductive terminal and the collocating portion are arranged longitudinally in a row; and the elastic conductive terminal extends beyond the collocating portion along a height direction; the elastic conductive terminal and the collocating portion are jointly collocated into the magnetically-adsorbed conductive track; the elastic conductive terminal of the electrical apparatus and the collocating portion are jointly collocated into the second space of the magnetically-adsorbed conductive track; and the elastic conductive terminal further extends into the first space and is elastically abutted against a surface of the conductive portion to form an electrical connection; the adapter includes: an insulating body, and a conductive terminal arranged in the insulating body and partially protruding and extending out of the insulating body; the conductive terminal has a flat sheet shape and includes: a base portion provided in the insulating body, and a docking portion protruding and extending out of the insulating body; the insulating body protrudes and extends at the docking portion adjacent to the conductive terminal to form a guiding portion spaced apart from the conductive terminal, and the insulating body is configured such that the guiding portion and the docking portion are jointly assembled into the at least two electrical apparatuses to achieve an electrical connection of the two electrical apparatuses.

According to the second aspect, it provides a magnetically-adsorbed conductive track system. The magnetically-adsorbed conductive track system may be configured to be mounted on a surface of a mounting foundation, including an adapter and at least two magnetically-adsorbed conductive tracks; the adapter includes an insulating body, and a conductive terminal arranged in the insulating body and partially protruding and extending out of the insulating body; the conductive terminal has a flat sheet shape, and includes a base portion arranged in the insulating body and a docking portion protruding and extending out of the insulating body; the insulating body protrudes and extends at the docking portion adjacent to the conductive terminal to form a guiding portion spaced apart from the conductive terminal, and the insulating body is configured such that the guiding portion and the docking portion are jointly assembled into the at least two electrical apparatuses to achieve an electrical connection of the at least two electrical apparatuses; the magnetically-adsorbed conductive track includes a main body portion, the main body portion extends along a length direction and has a flat shape, and the main body portion includes an adsorbing wall, a mounting wall arranged opposite to the adsorbing wall, a pair of side walls connecting the adsorbing wall and the mounting wall, and a pair of partition walls parallel to the side walls and located between the side walls; the side walls and the partition walls, respectively, together with the adsorbing wall and the mounting wall, form conductive grooves extending in the length direction and located at both sides, and form an accommodating space located between the conductive grooves; a slot is formed in a direction from the adsorbing wall towards the mounting wall and is in communication with the conductive grooves; a pair of insulating portions, each accommodated in the conductive groove and provided with an accommodating portion in communication with the slot of the adsorbing wall; a pair of conductive portions, each accommodated in the accommodating portion of the insulating portion; and a magnetic element accommodated in the accommodating space and attached to the adsorbing wall; the magnetically-adsorbed conductive track includes a main body portion and end portions arranged at both ends of the main body portion; the main body portion is embedded with the conductive portion; the end portion is configured to be electrically connected with the conductive portion and the conductive terminal of the adapter at the same time, and to be mechanically connected with the main body portion of the magnetically-adsorbed conductive track and the adapter at the same time.

According to the third aspect, it provides a magnetically-adsorbed conductive track. The a magnetically-adsorbed conductive track may be configured to be assembled on a mounting foundation and be magnetically adsorbed to and electrically connected with an electrical apparatus, including: a main body portion, extending along a length direction and having a flat shape, and including an adsorbing wall, a mounting wall arranged opposite to the adsorbing wall, a pair of side walls connecting the adsorbing wall and the mounting wall, and a pair of partition walls parallel to the side walls and located between the side walls; the side walls and the partition walls, respectively, together with the adsorbing wall and the mounting wall, form conductive grooves extending in the length direction and located at both sides, and form an accommodating space located between the conductive grooves; a slot is formed in a direction from the adsorbing wall towards the mounting wall, and is in communication with the conductive grooves; a pair of insulating portions, each accommodated in the conductive groove and formed with an accommodating portion in communication with the slot of the adsorbing wall; a pair of conductive portions, each accommodated in the accommodating portion of the insulating portion; and a magnetic element, accommodated in the accommodating space and attached to the adsorbing wall.

It is to be understood that both the foregoing general description and the following detailed description are exemplary and explanatory only and are not restrictive of the present disclosure.

BRIEF DESCRIPTION OF THE DRAWINGS

The drawings described herein are used to provide further understanding of the present disclosure and constitute a part of the present disclosure. Illustrative embodiments of the present disclosure and description thereof are used to explain the present disclosure, and do not constitute any improper limit to the present disclosure. In the drawings:

DESCRIPTION OF REFERENCE SIGNS

Figure 1:
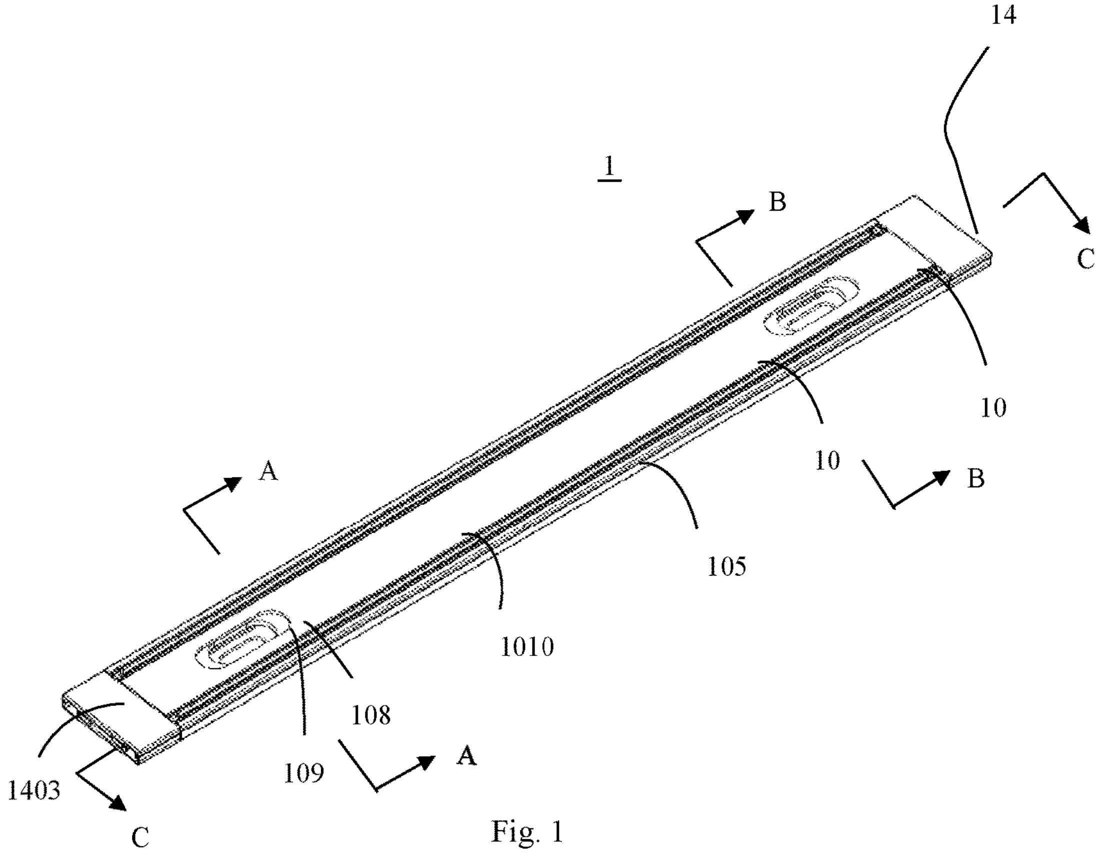
Figure 2:
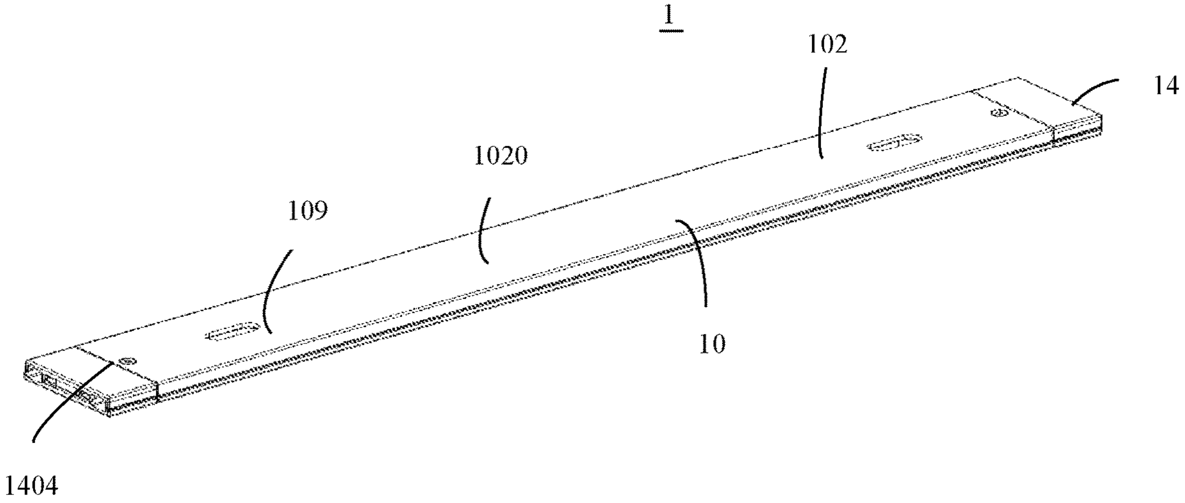
Figure 3:
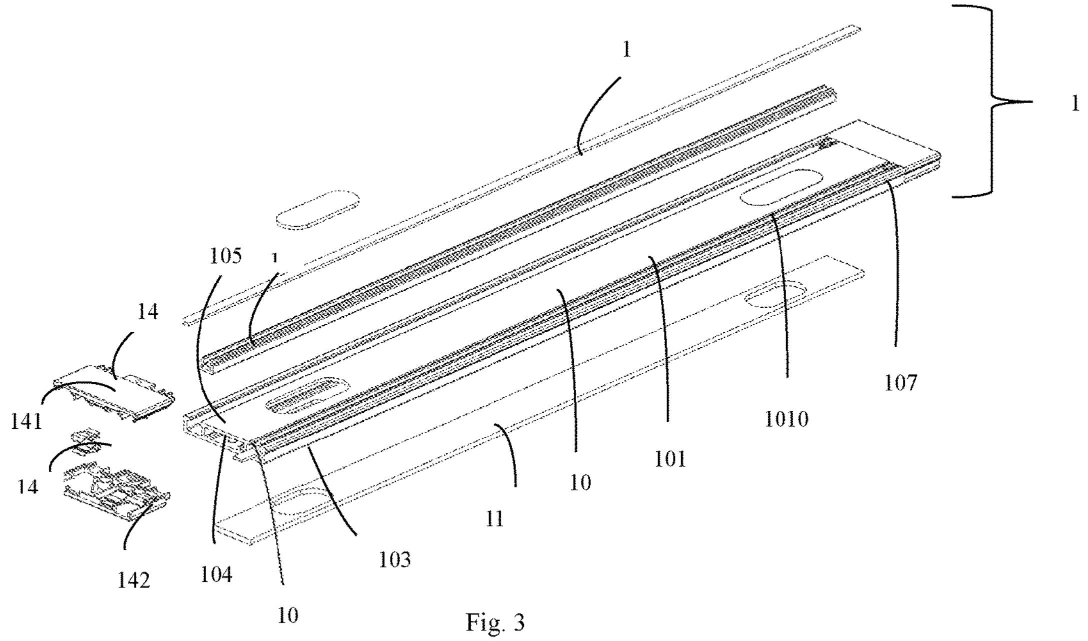
Figure 4:
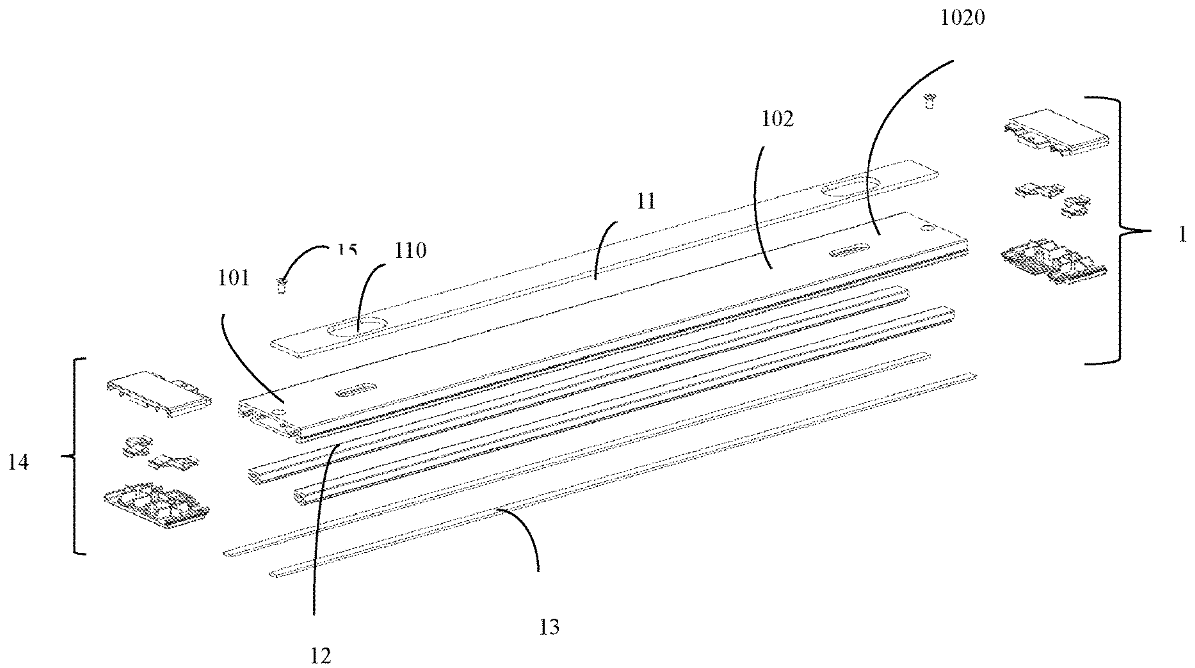
Figure 5:
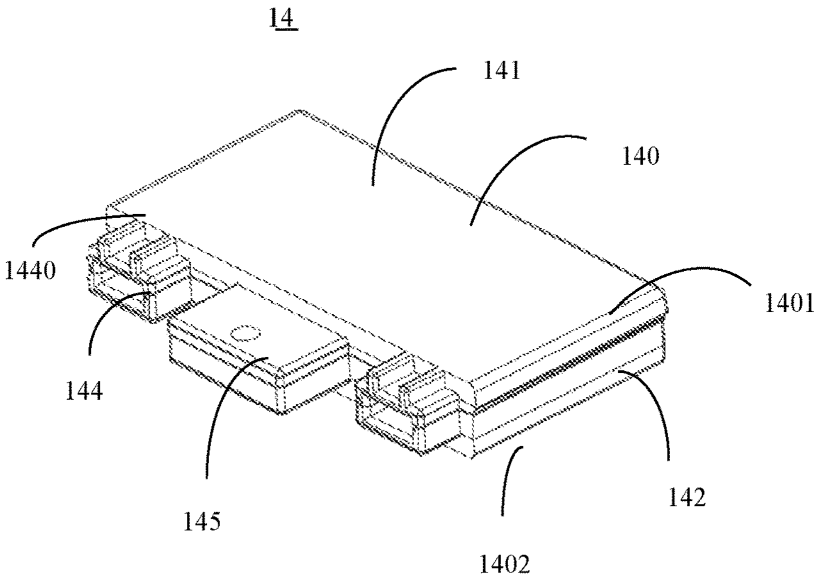
Figure 6:
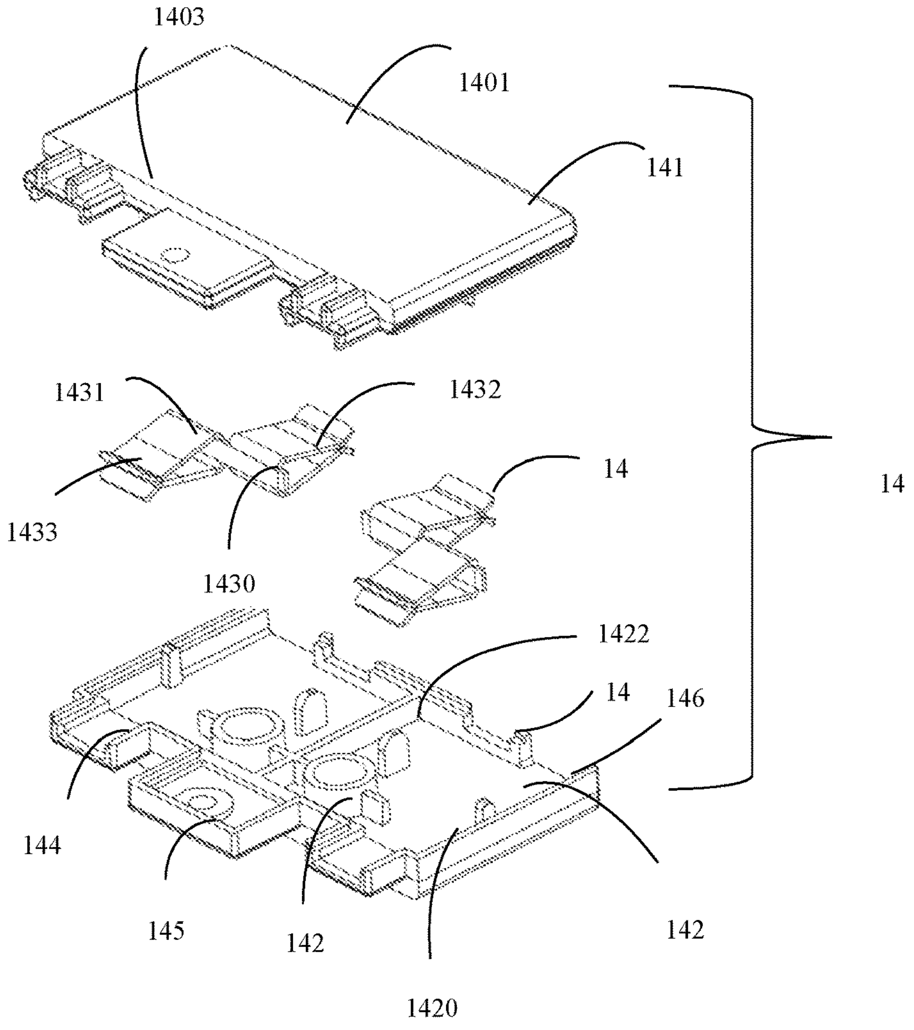
Figure 7:
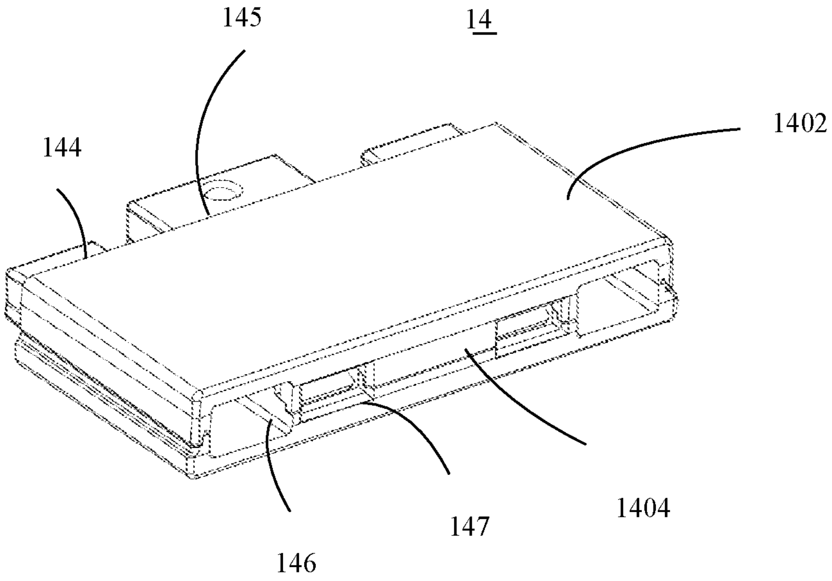
Figure 8:
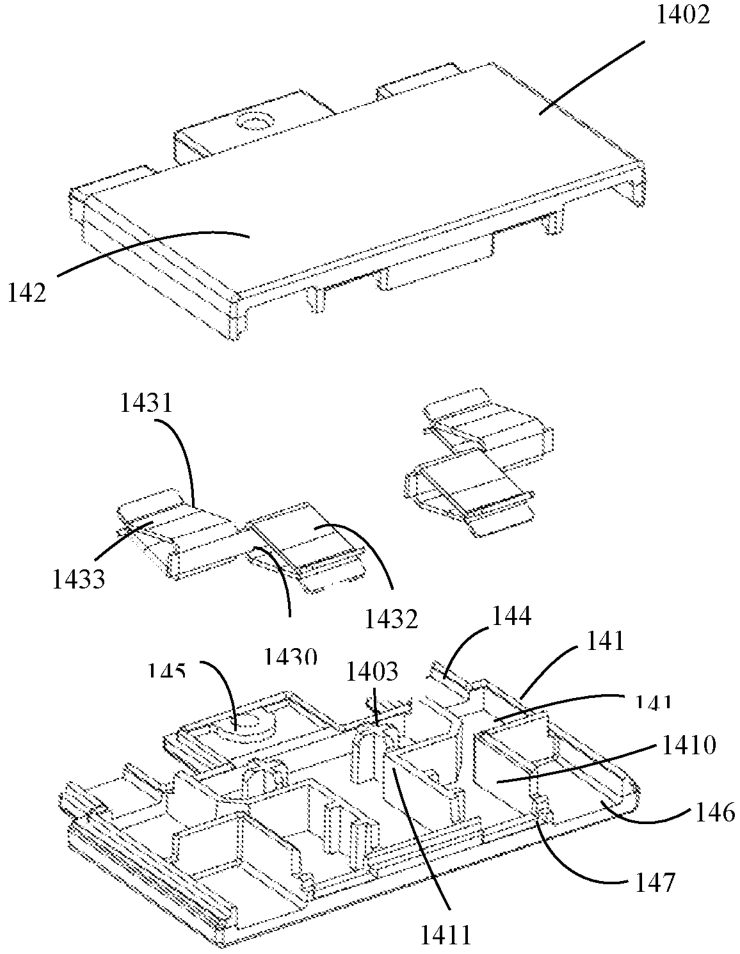
Figure 9:
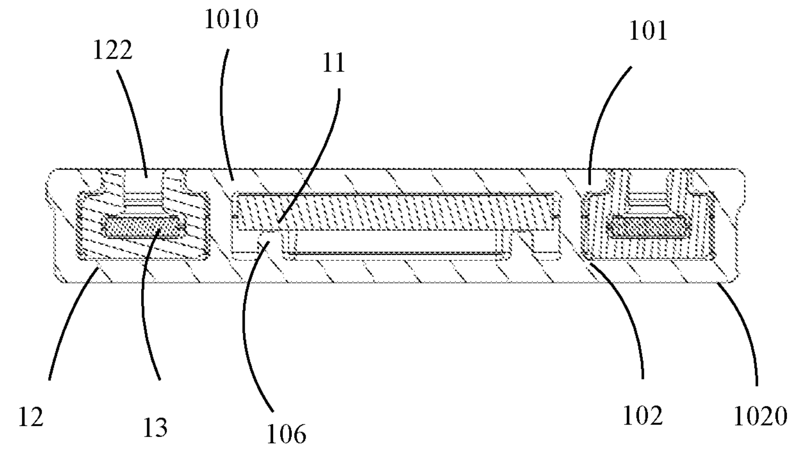
Figure 10:
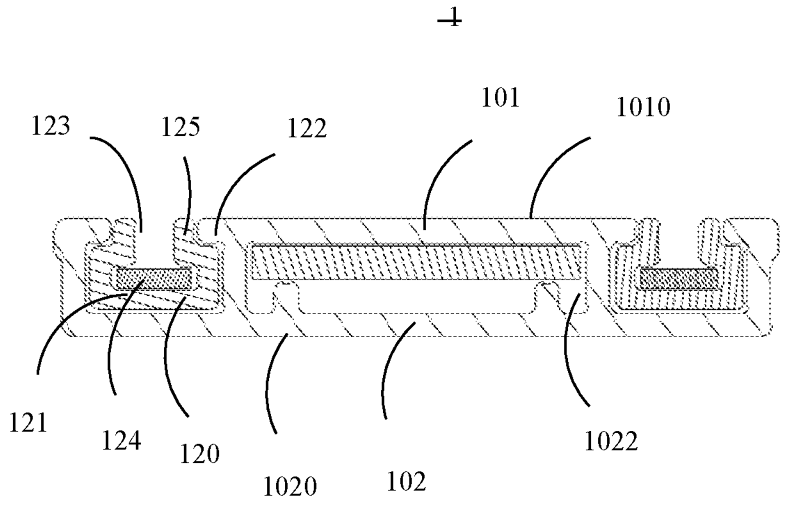
Figure 11:
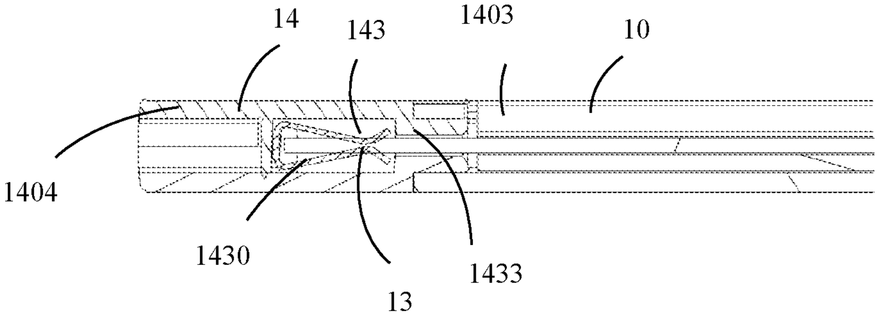
Figure 12:
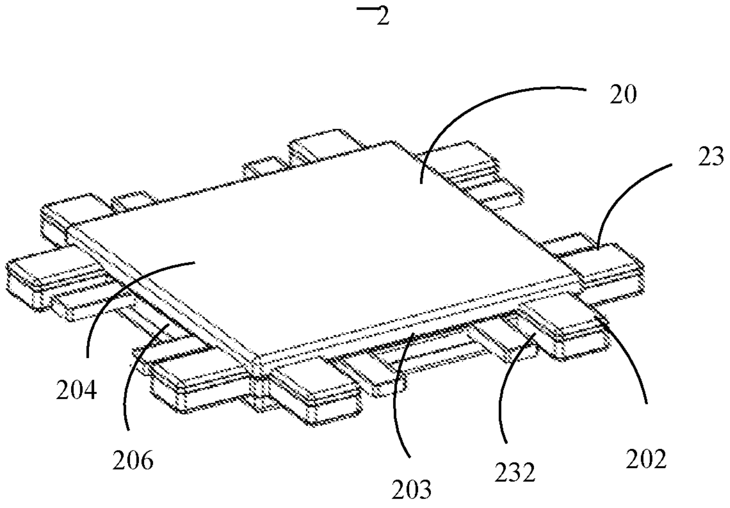
Figure 13:
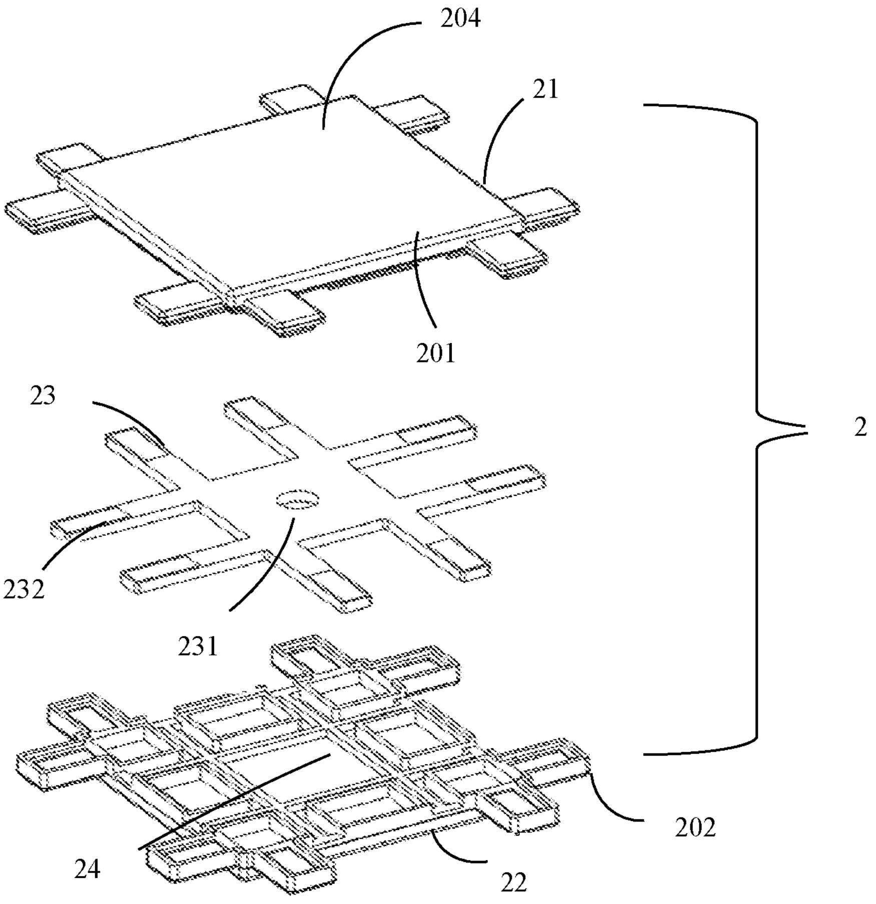
Figure 14:
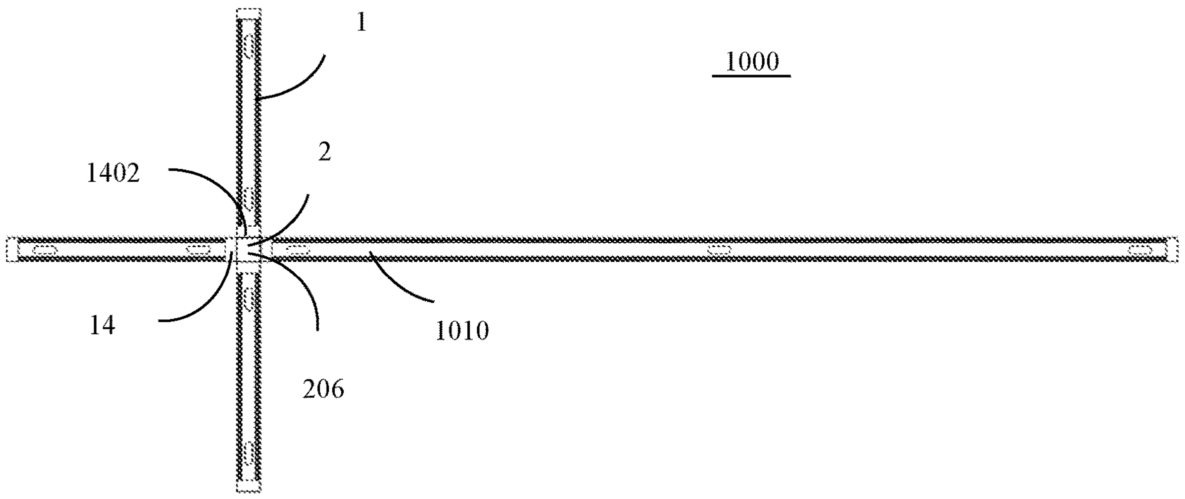
Figure 15:
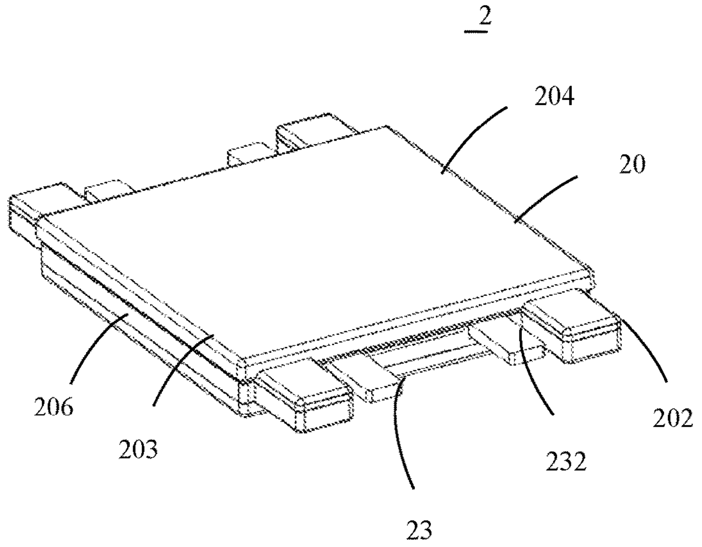
Figure 16:
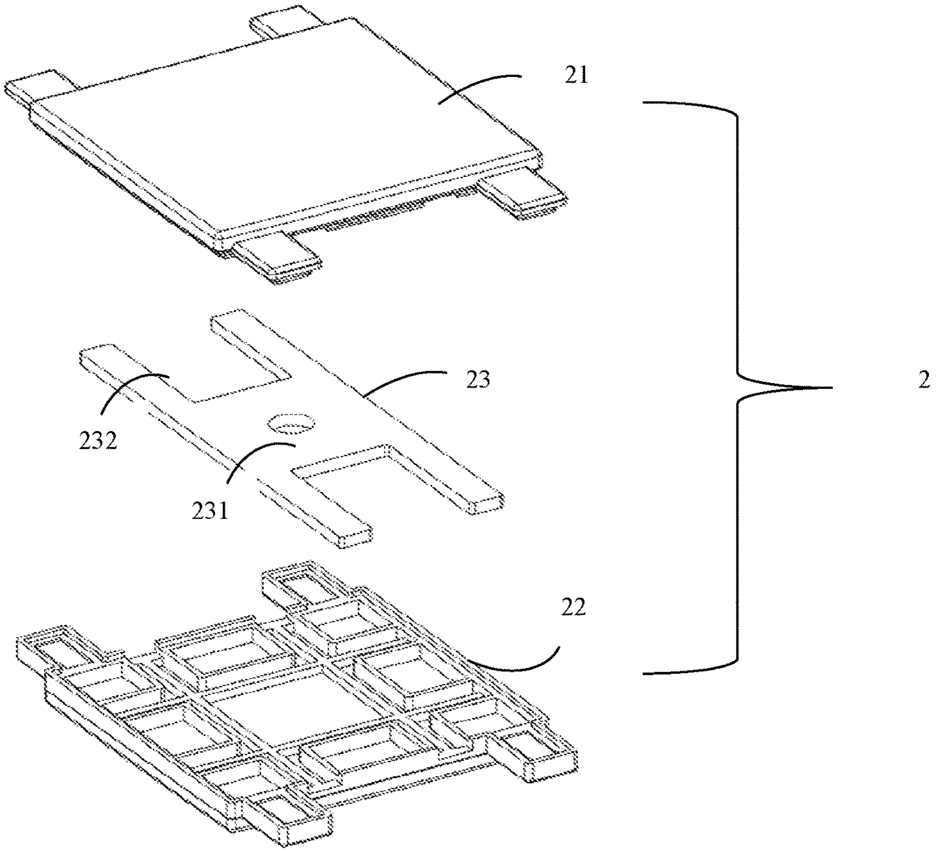
Figure 17:
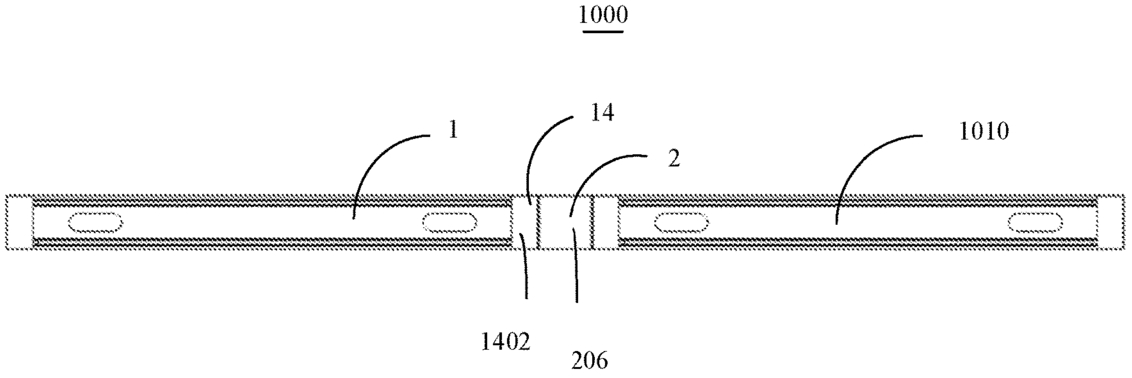
Figure 18:
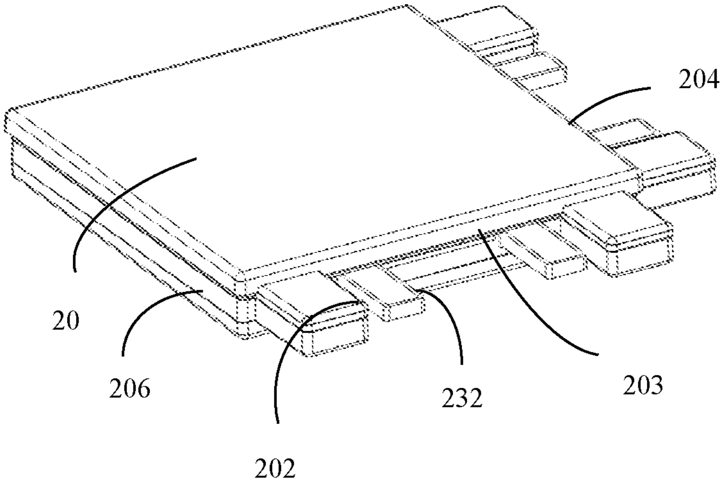
Figure 19:
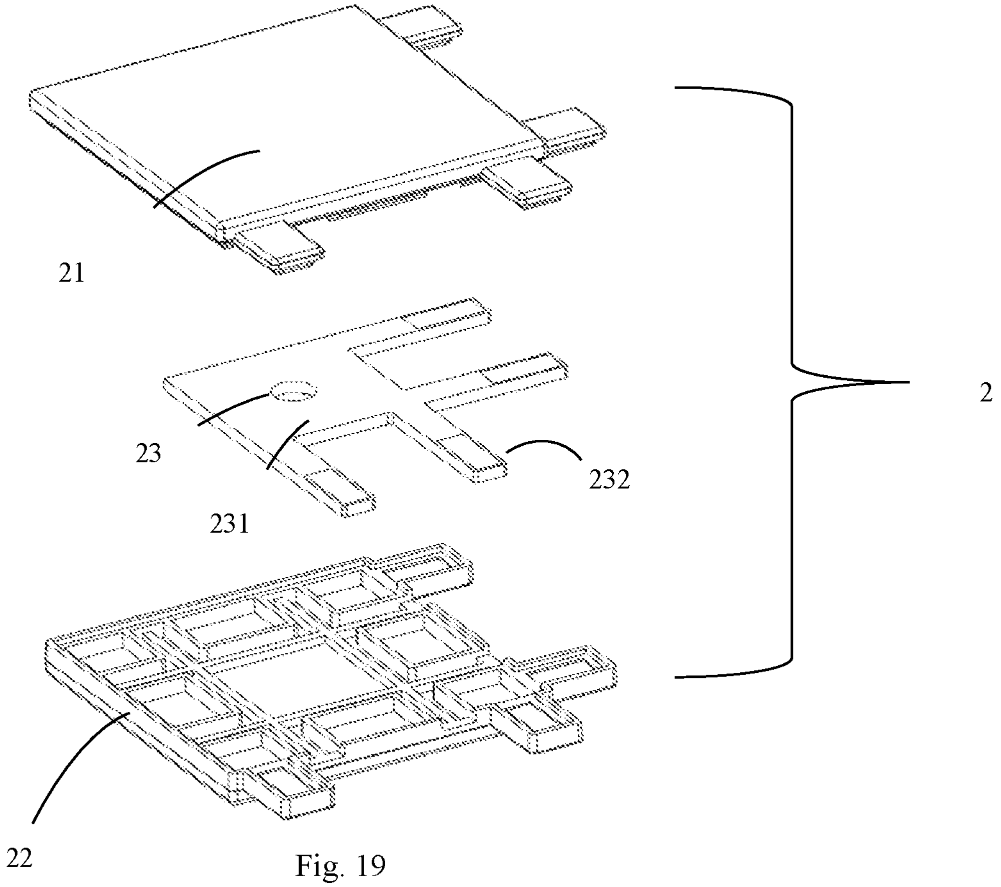
Figure 20:
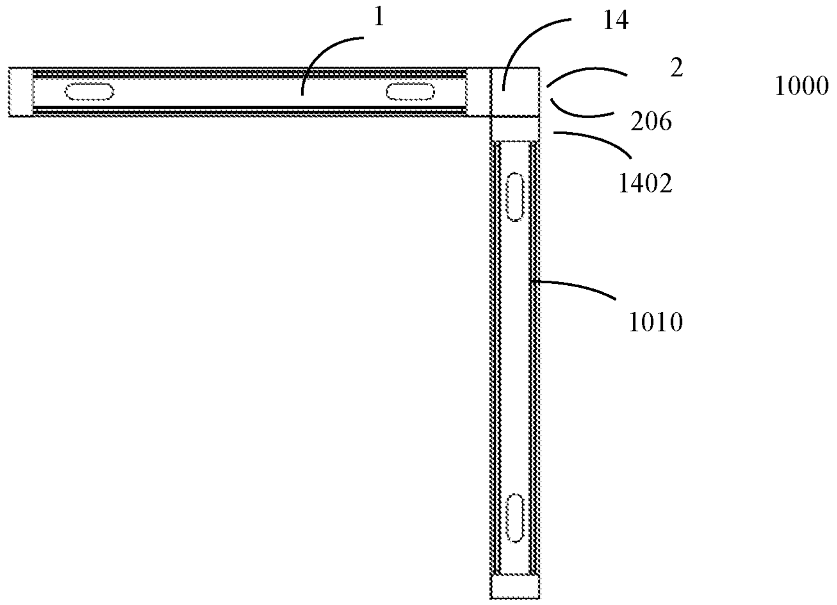
Figure 21:
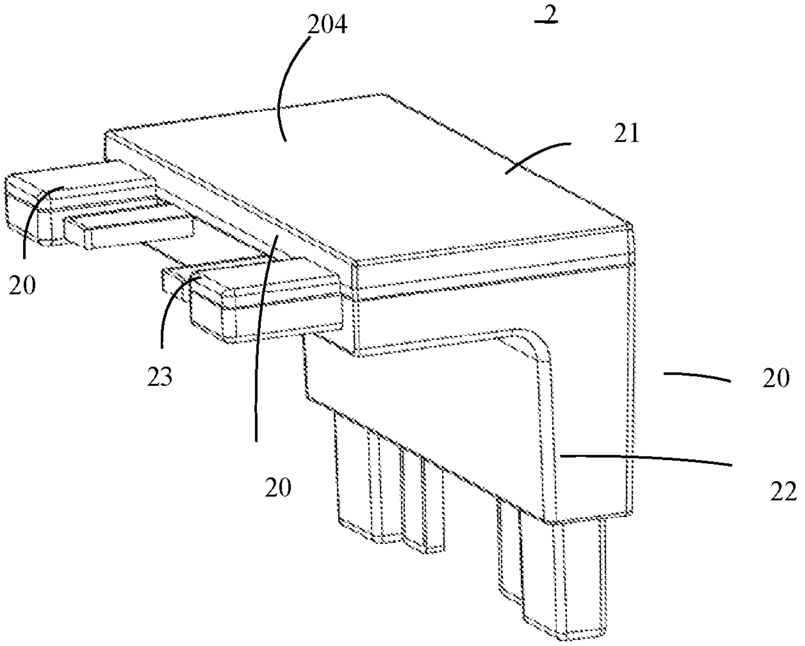
Figure 22:
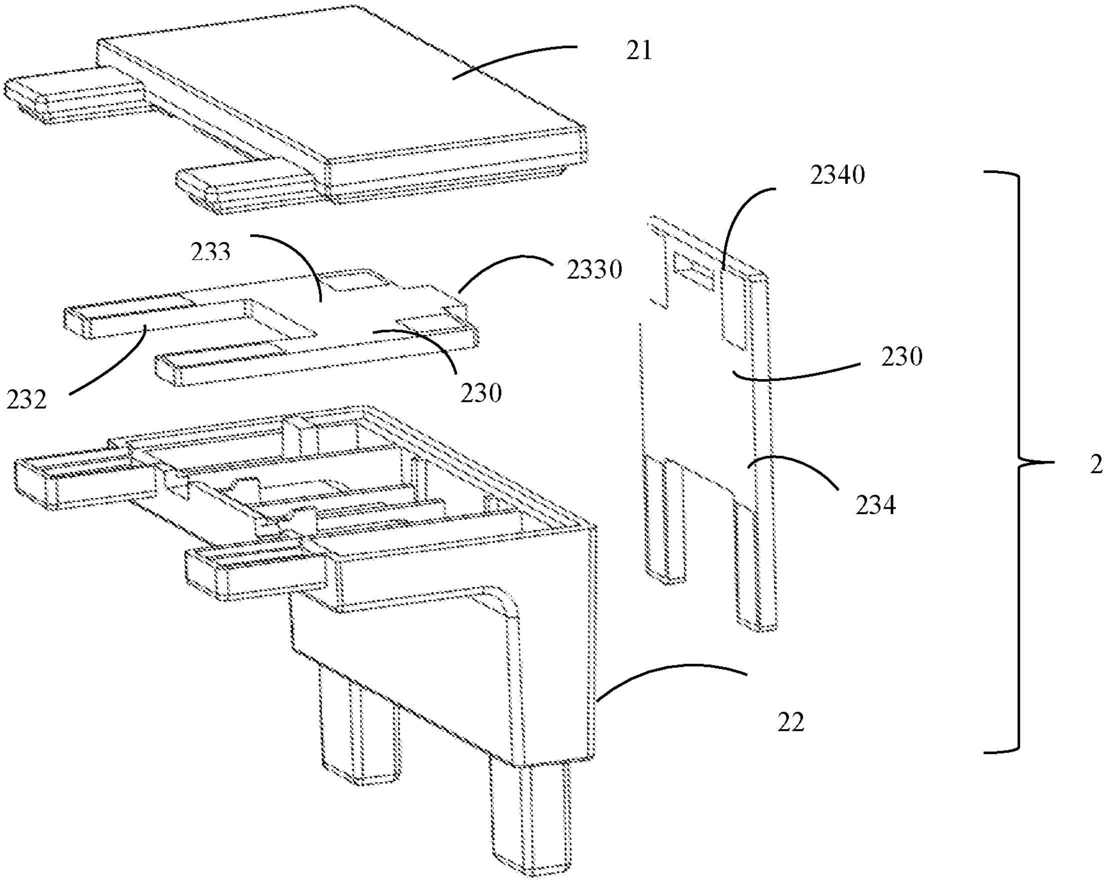
Figure 23:
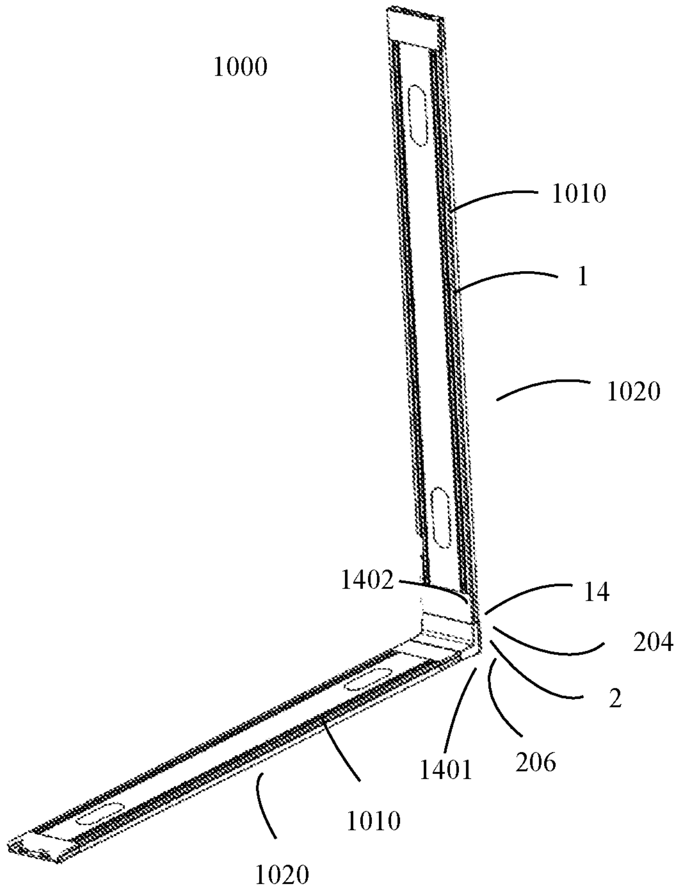
Figure 24:
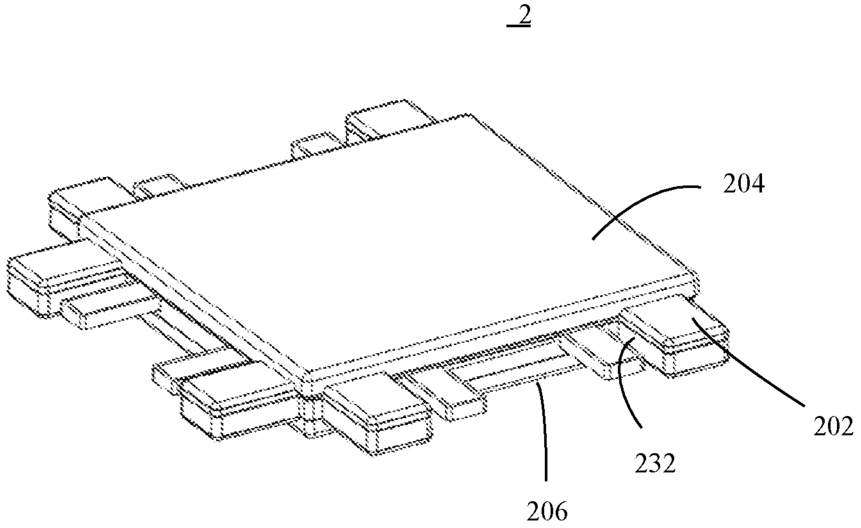
Figure 25:
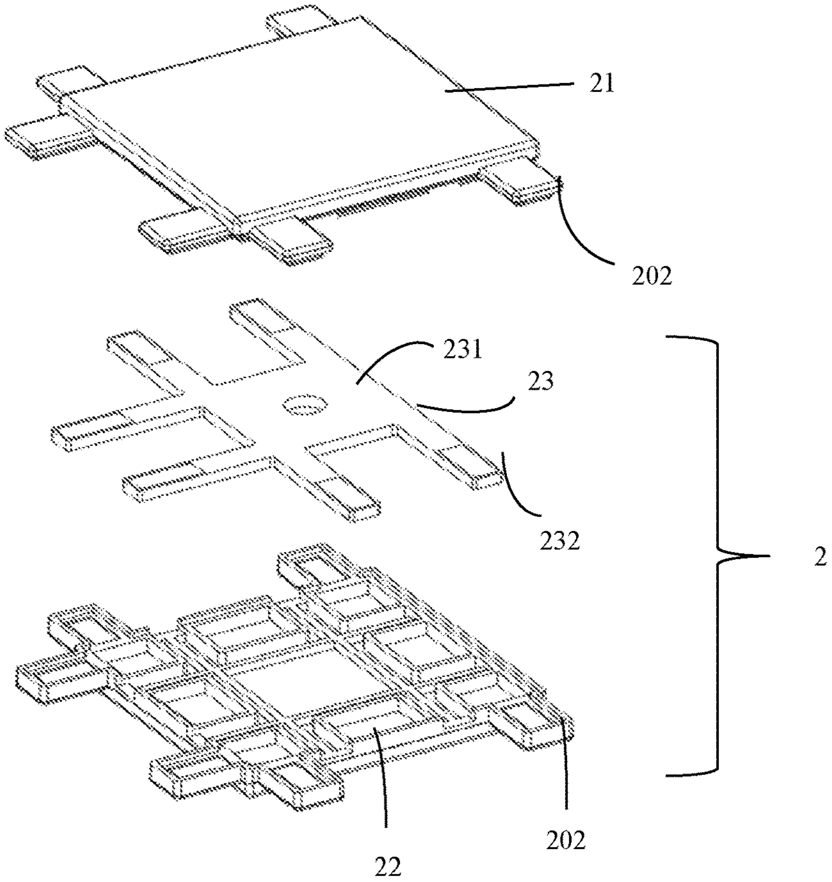
Figure 26:
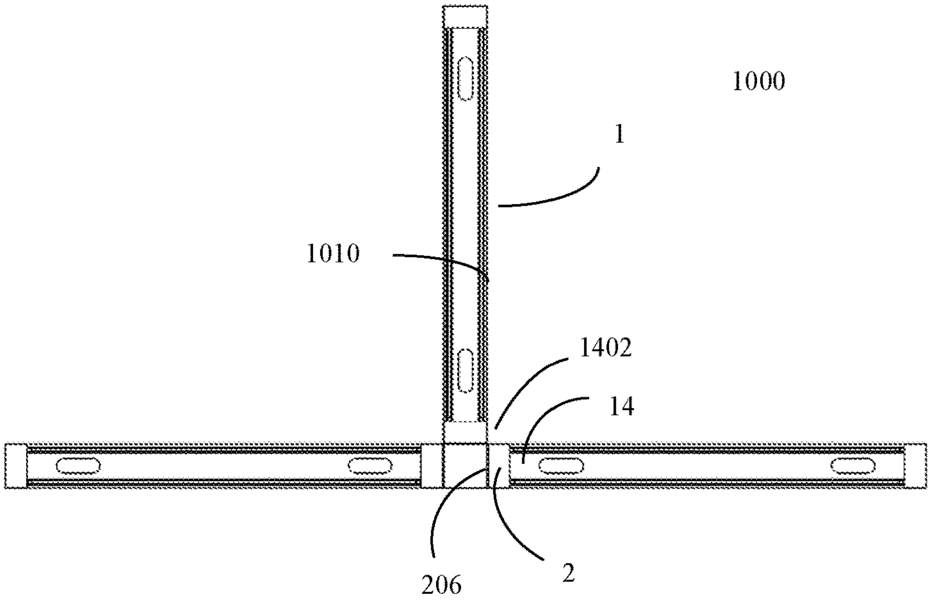
Figure 27:
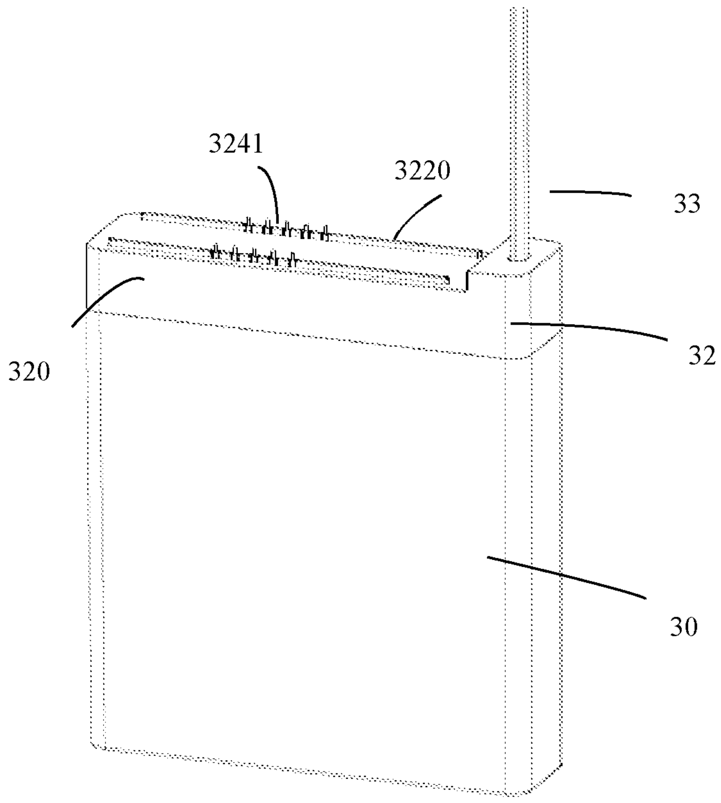
Figure 28:
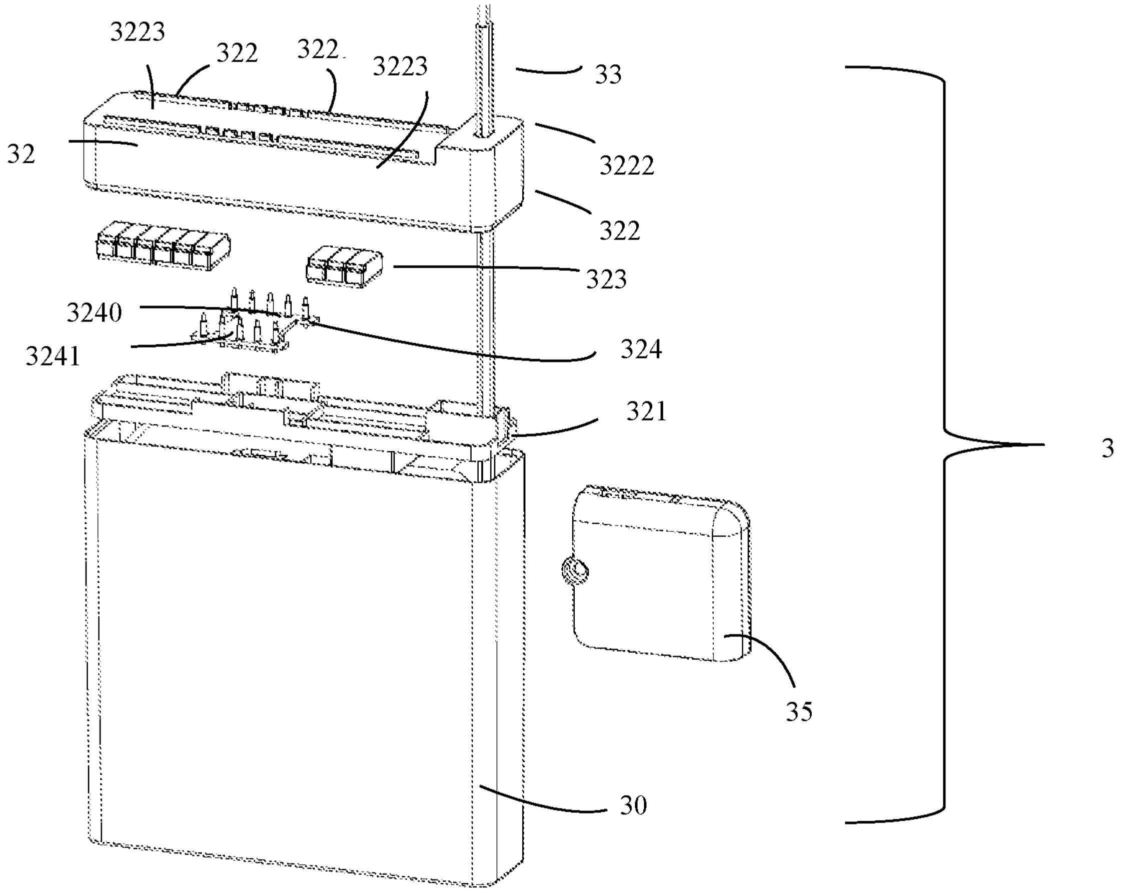
Figure 29:
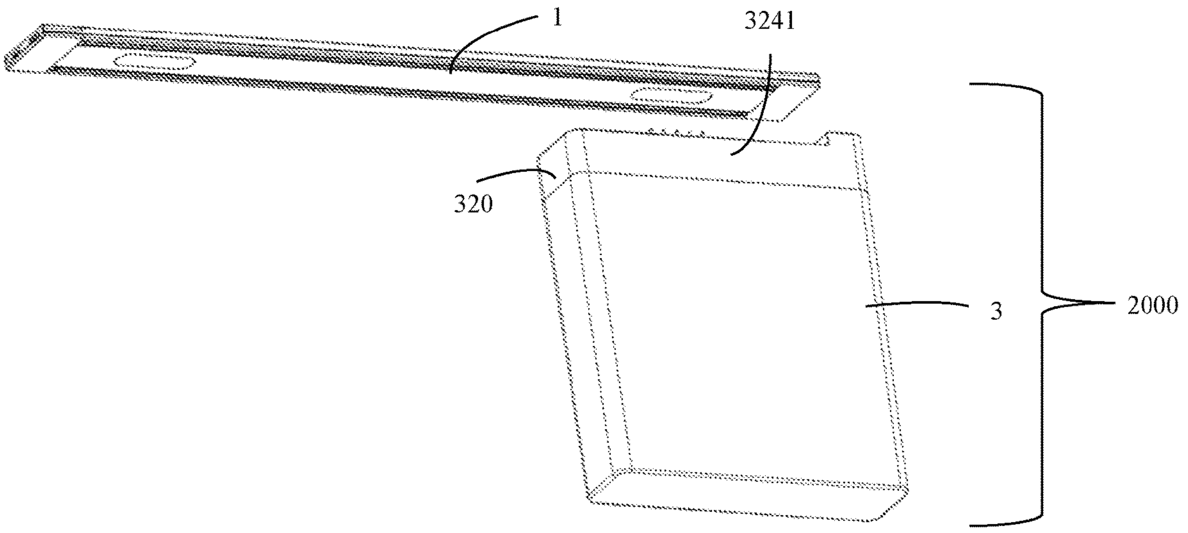
Figure 30:
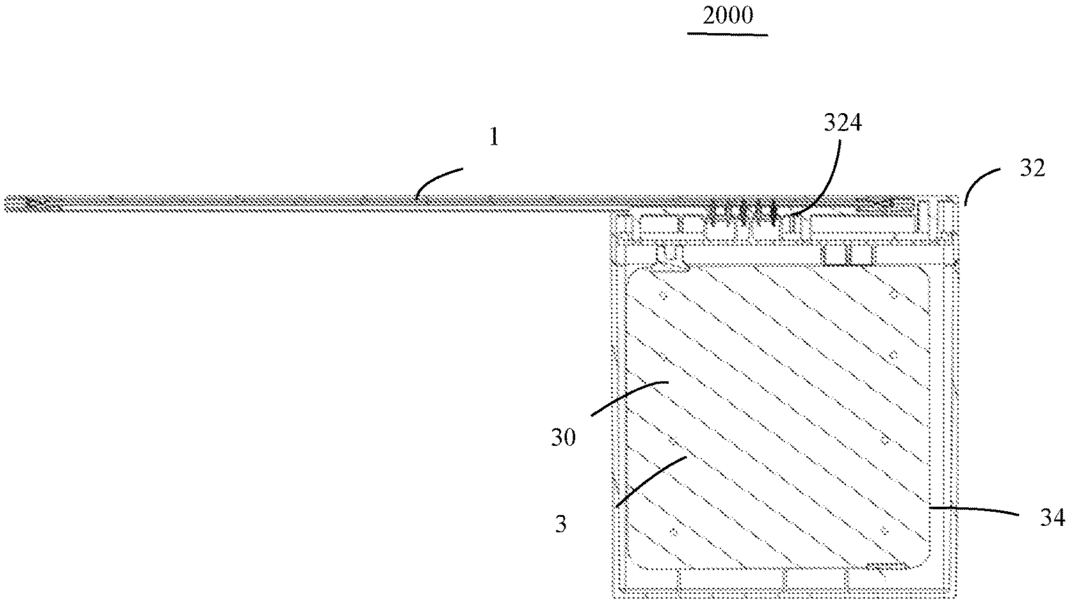
Figure 31:
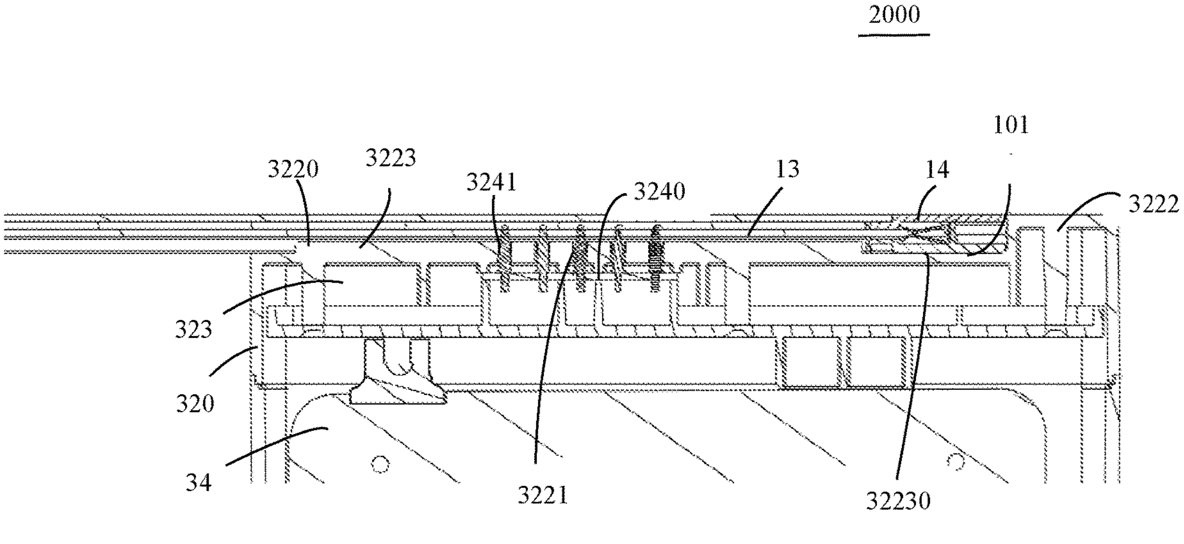
Figure 32:
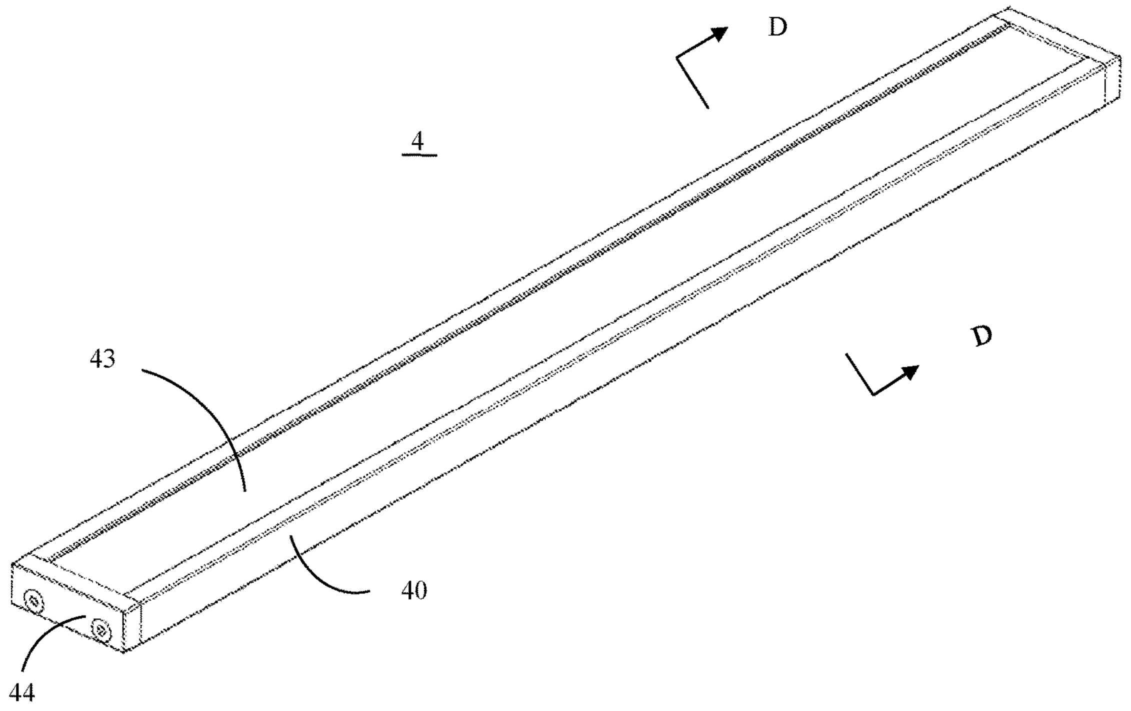
Figure 33:
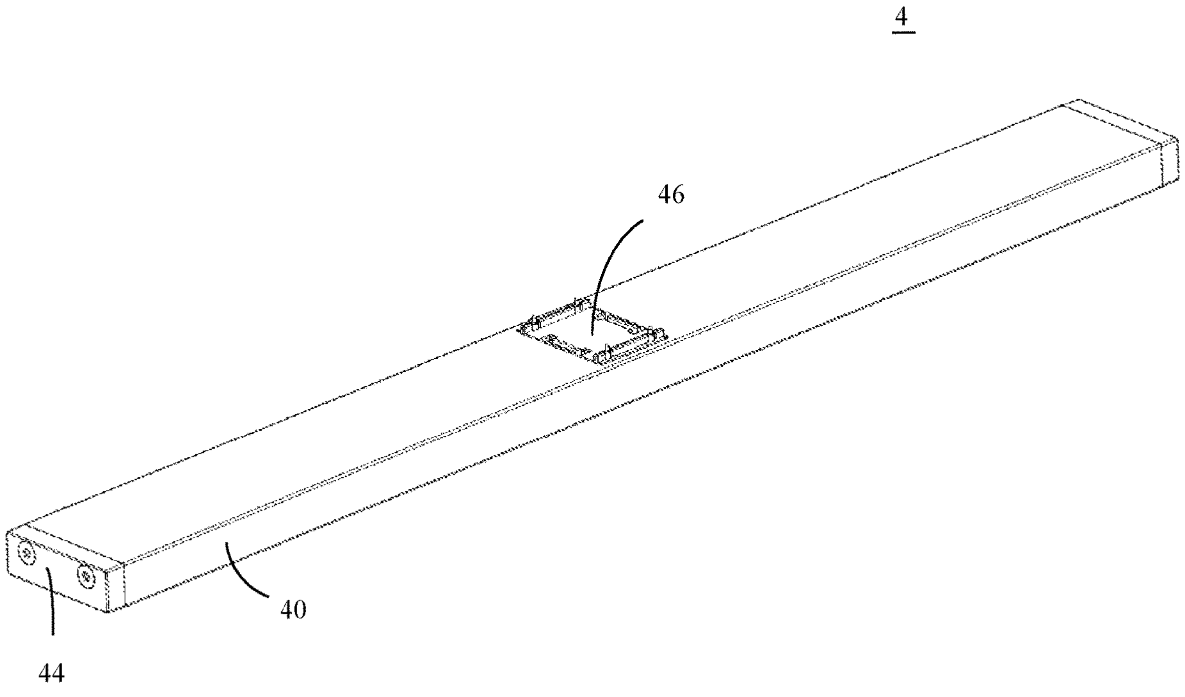
Figure 34:
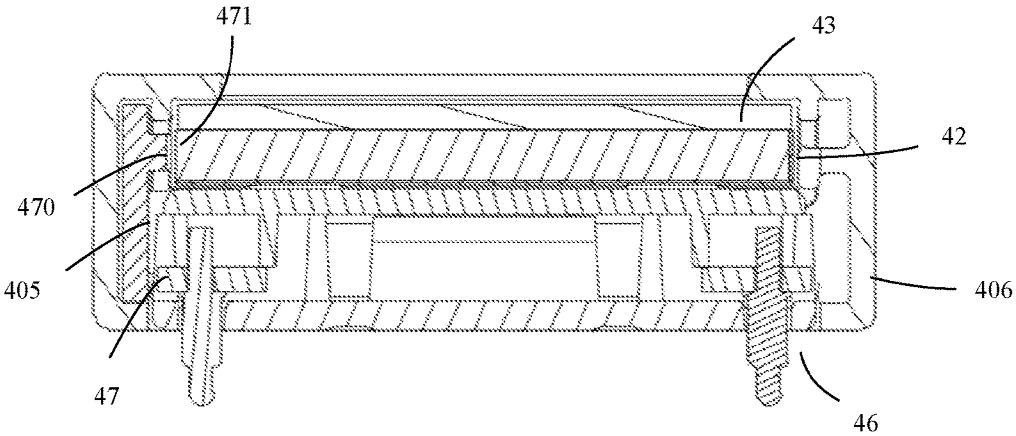
Figure 35:
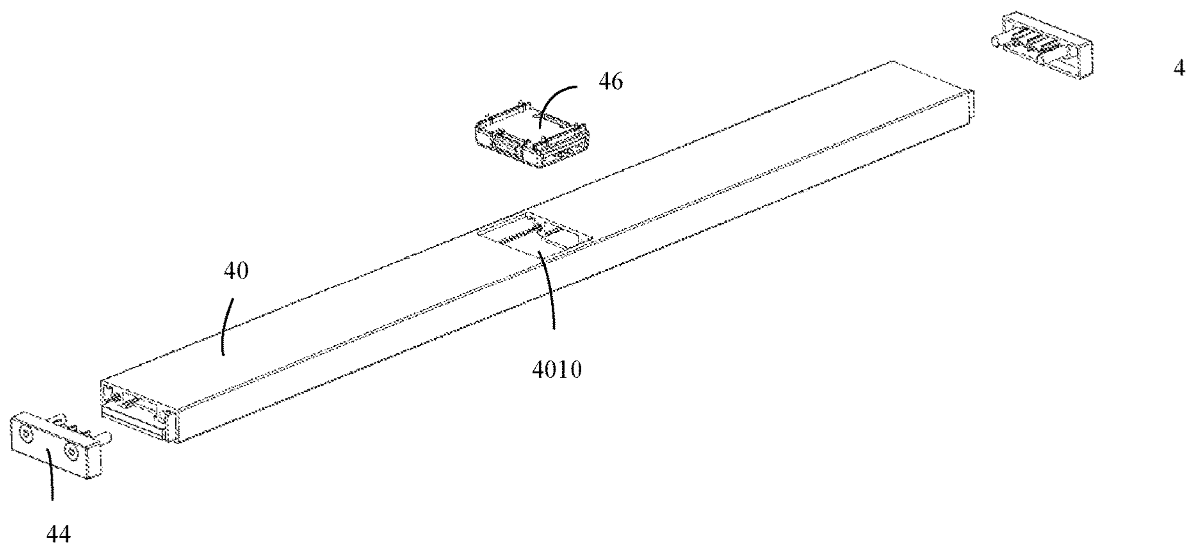
Figure 36:
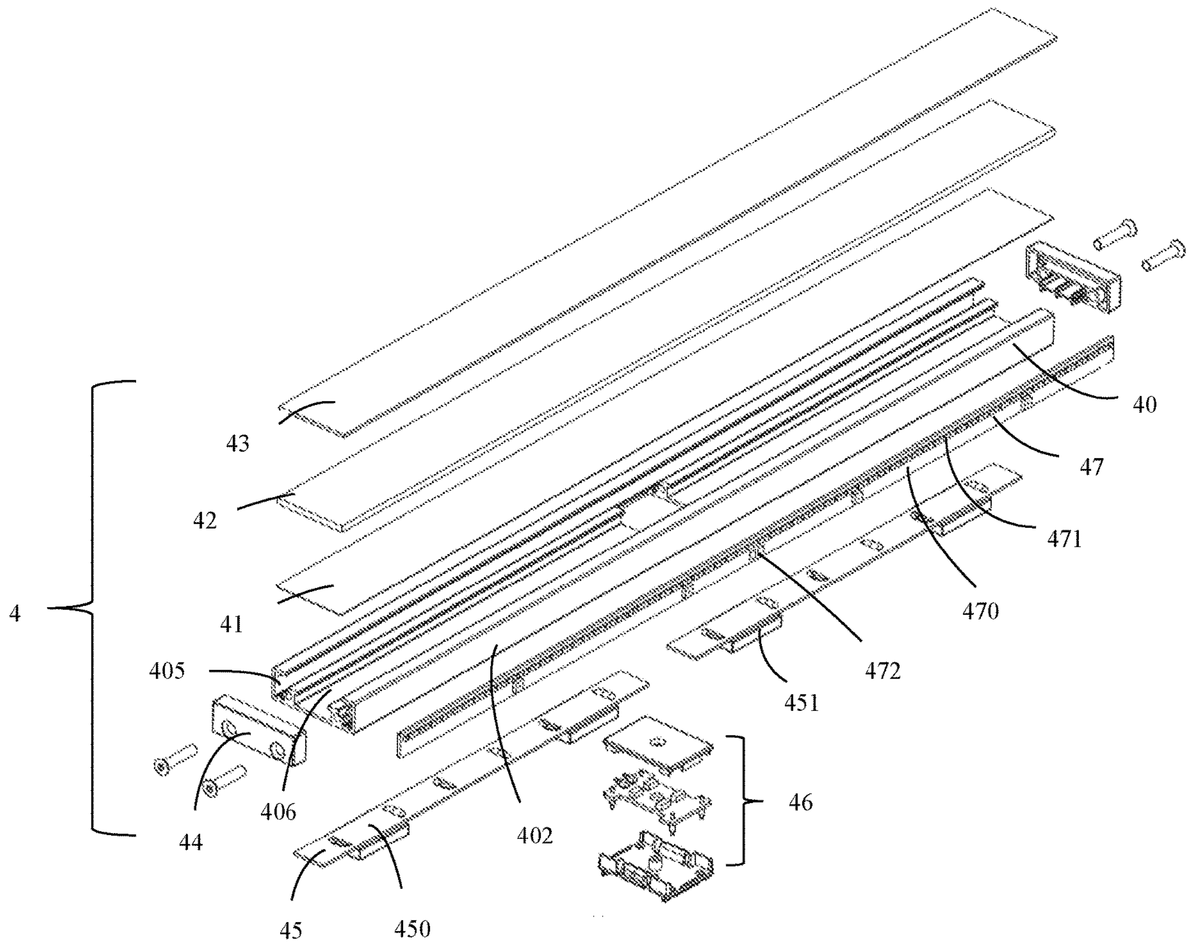
Figure 37:
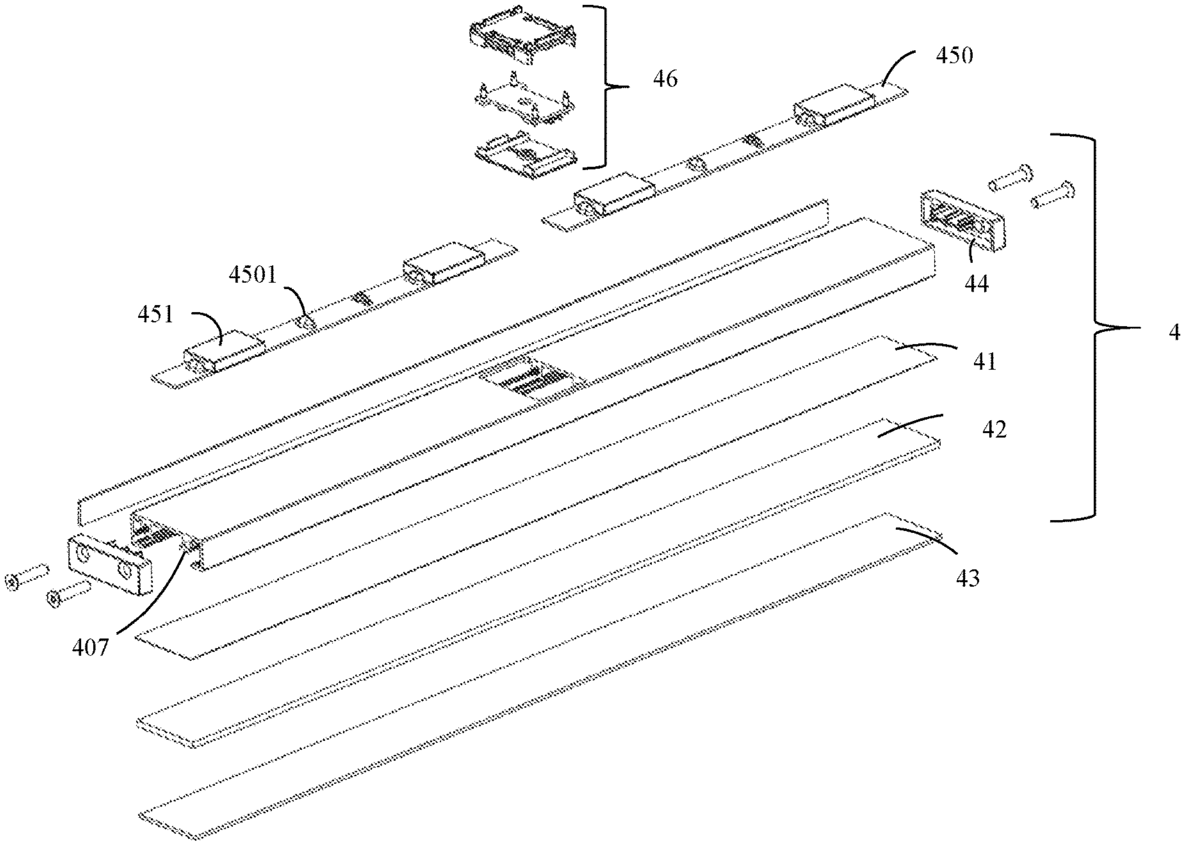
Figure 38:
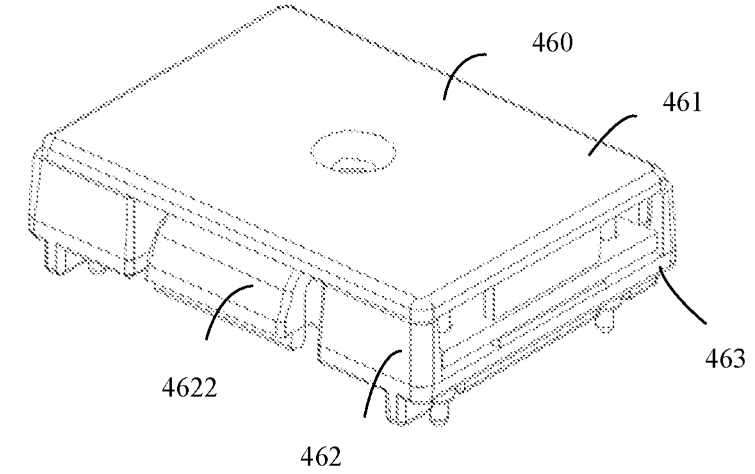
Figure 39:
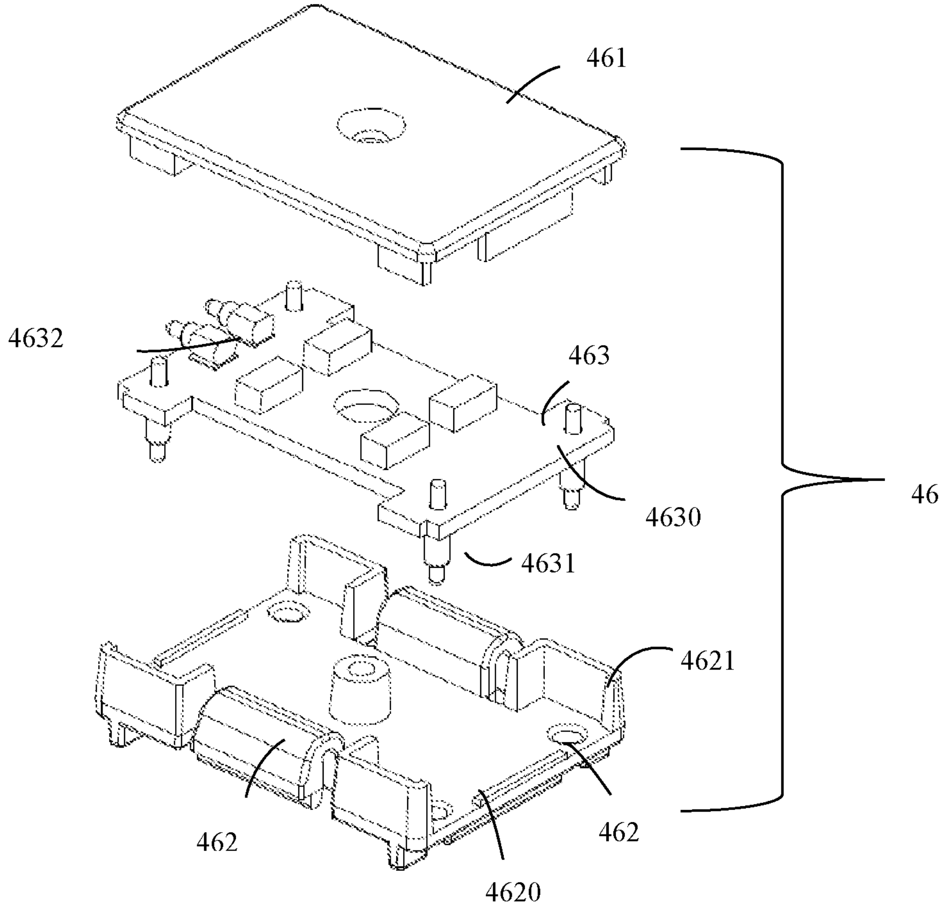
Figure 40:
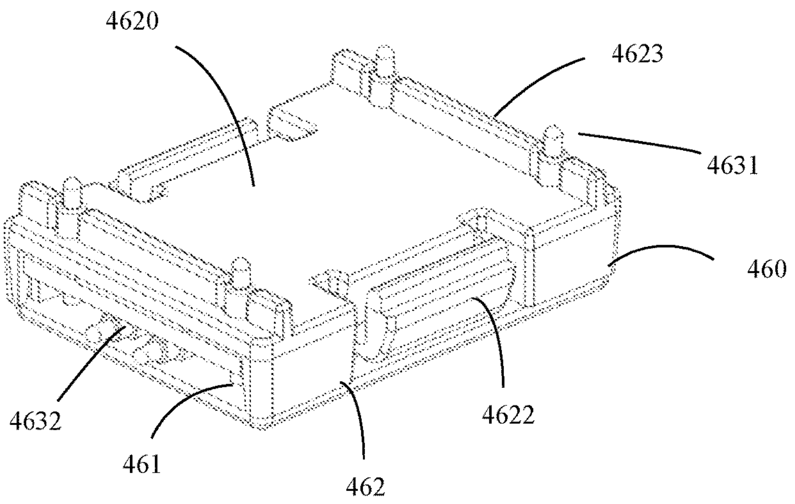
Figure 41:
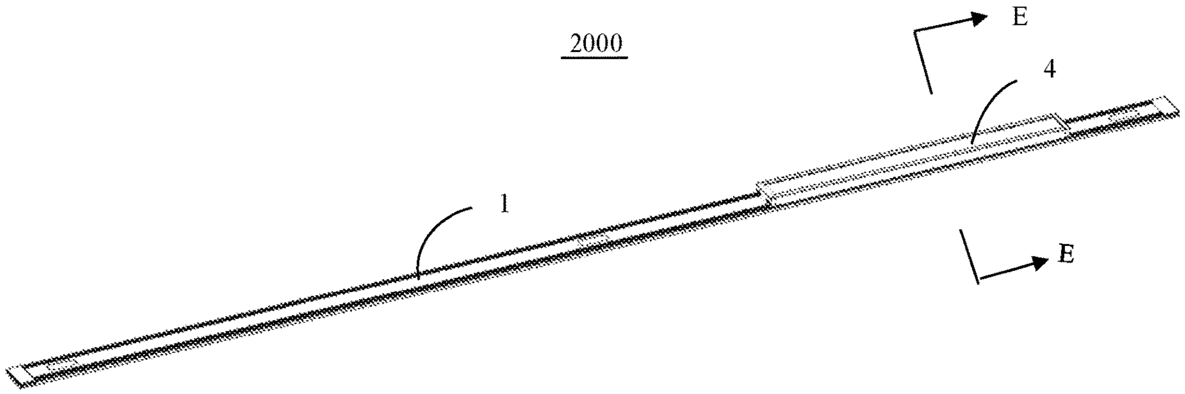
Figure 42:
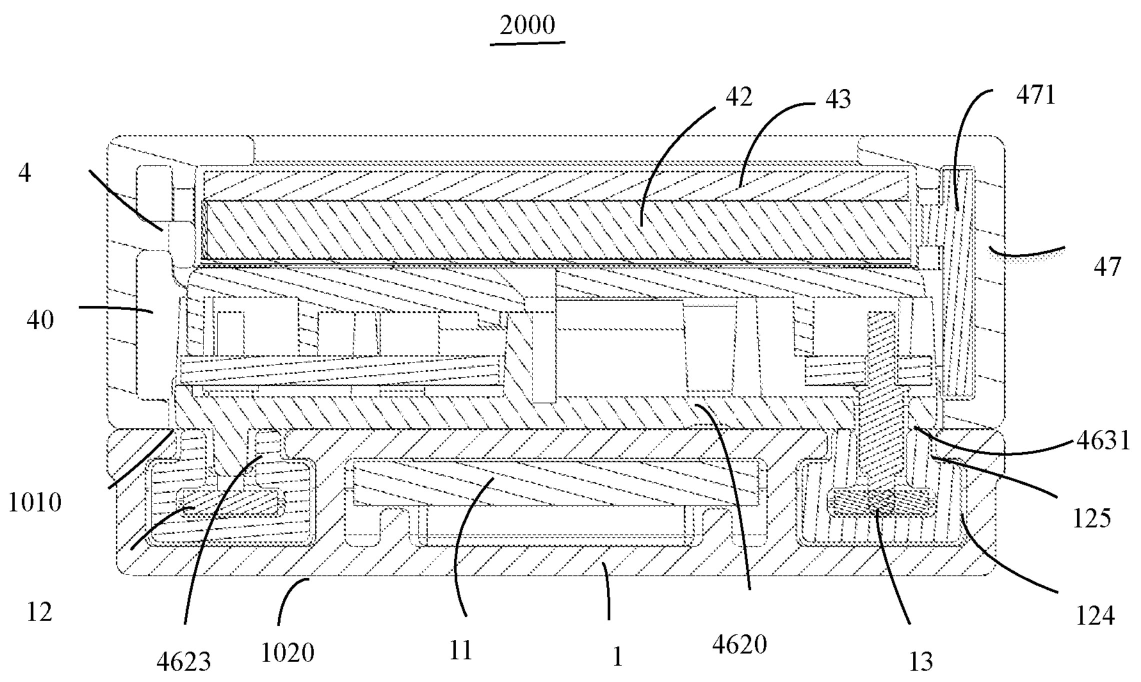
Figure 43:
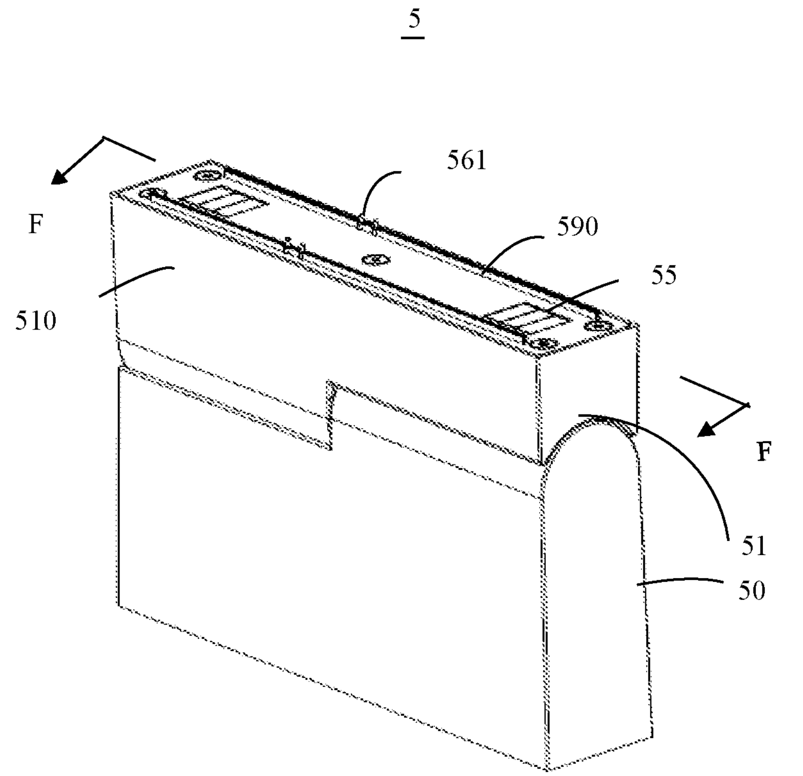
Figure 44:
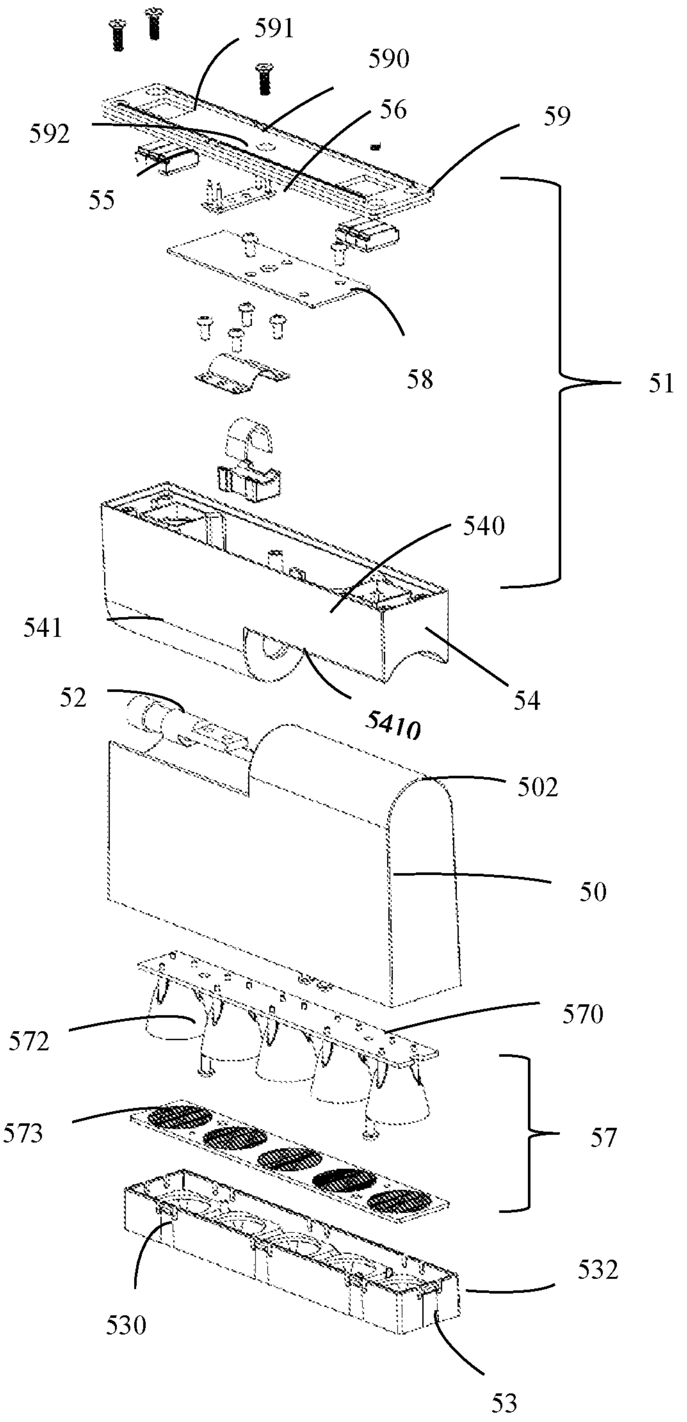
Figure 45:
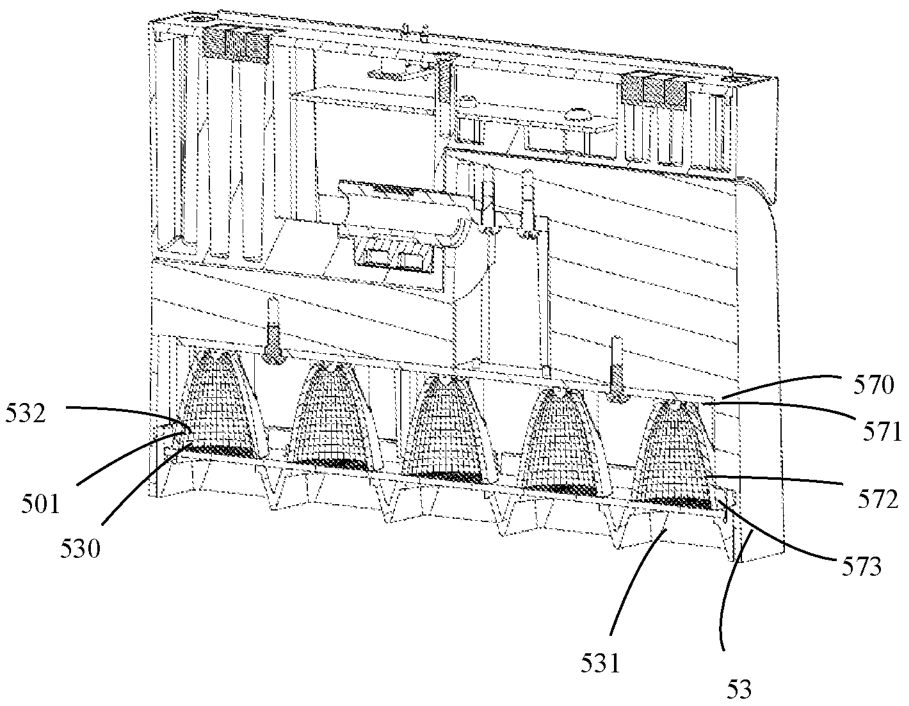
Figure 46:
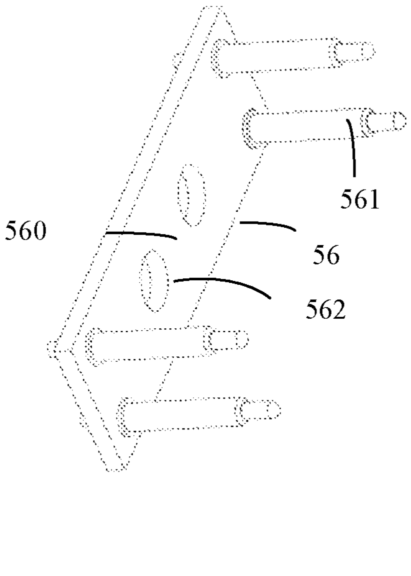
Figure 47:
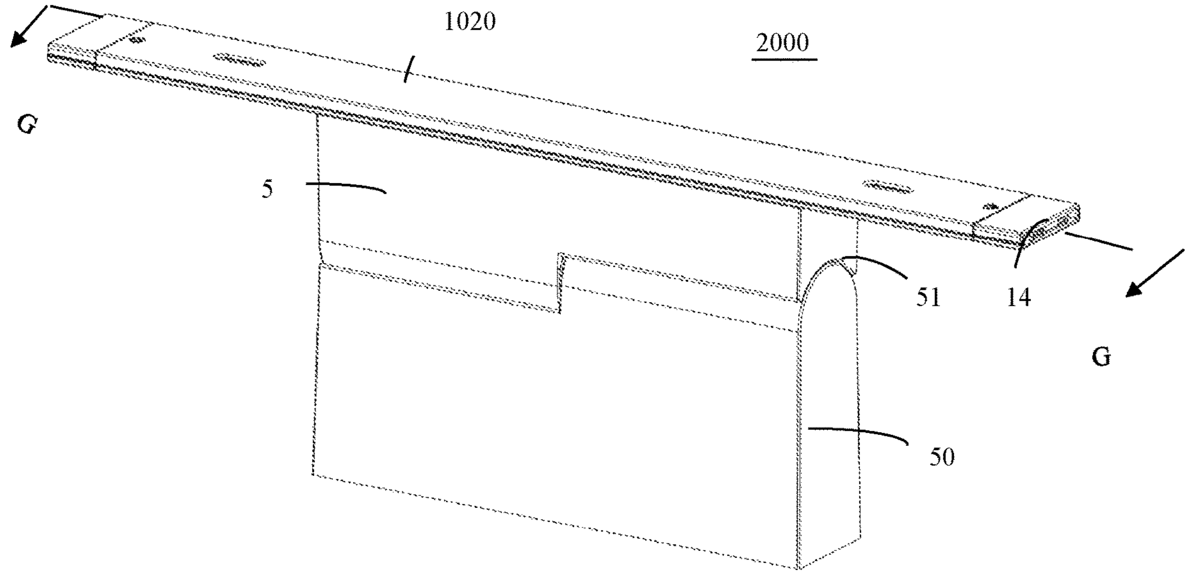
Figure 48:
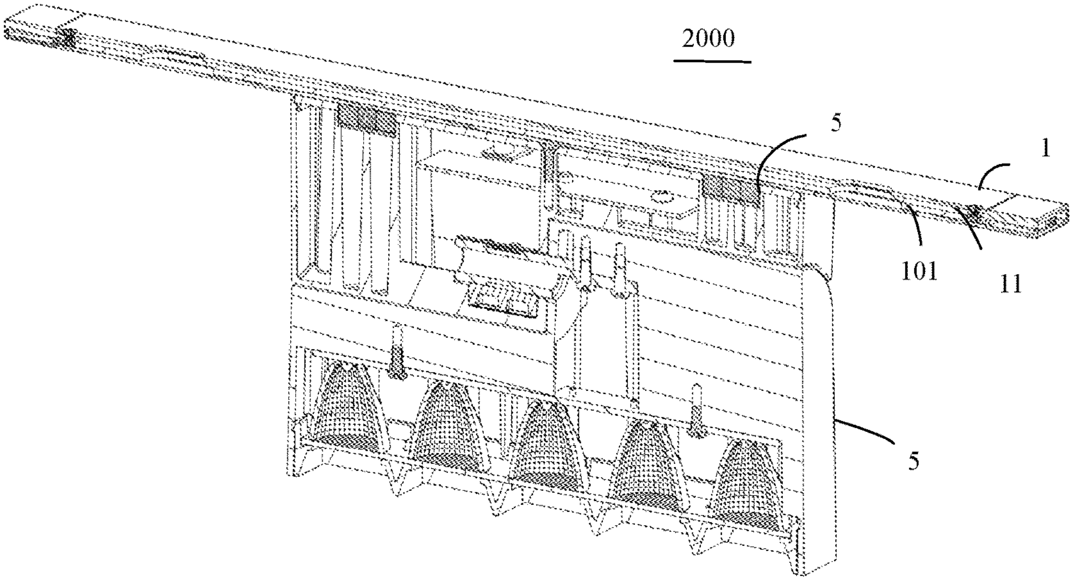
Figure 49:
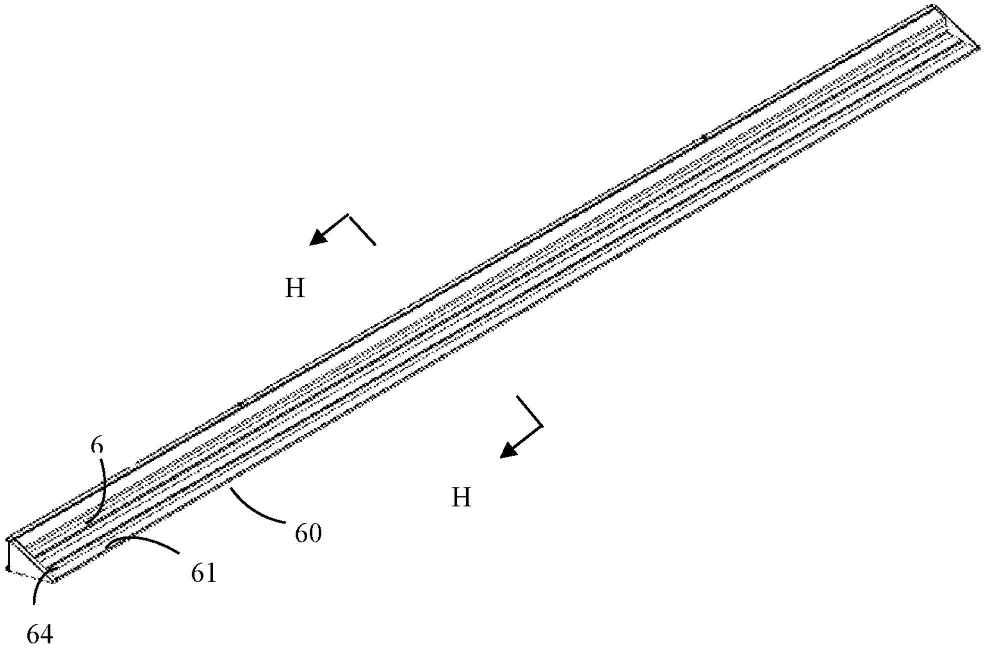
Figure 50:
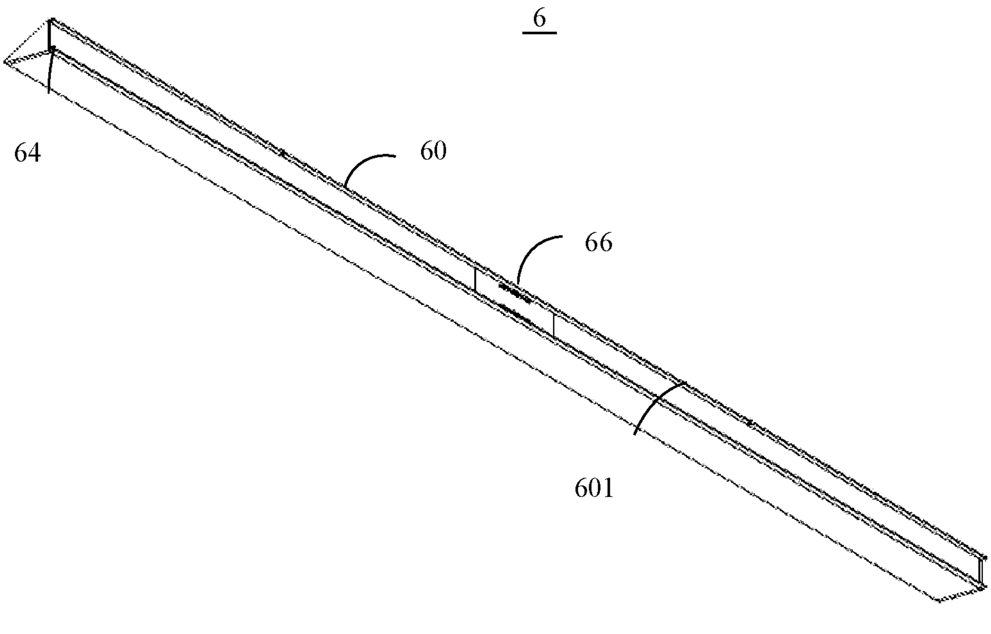
Figure 51:
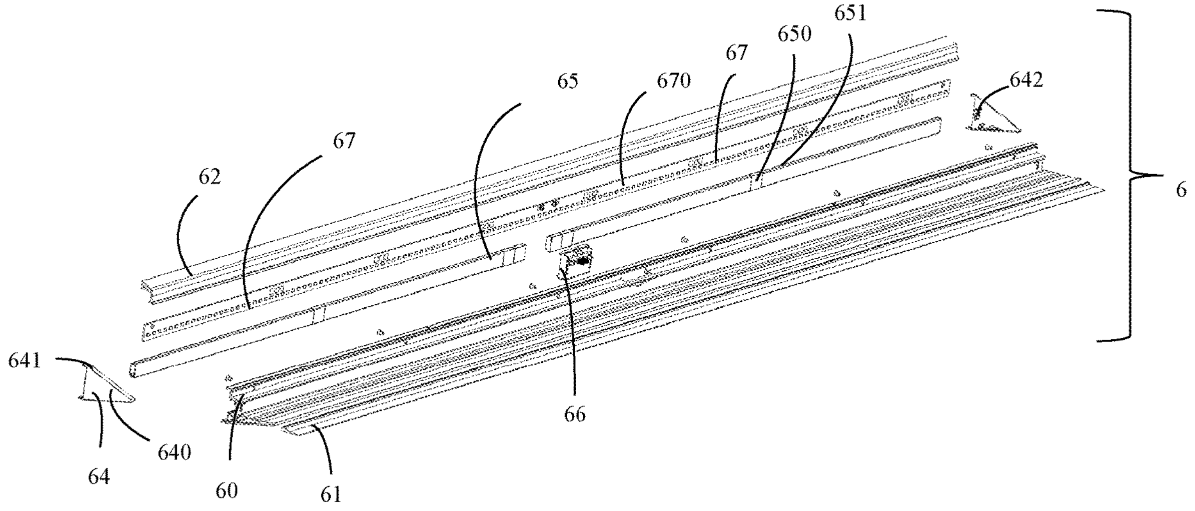
Figure 52:
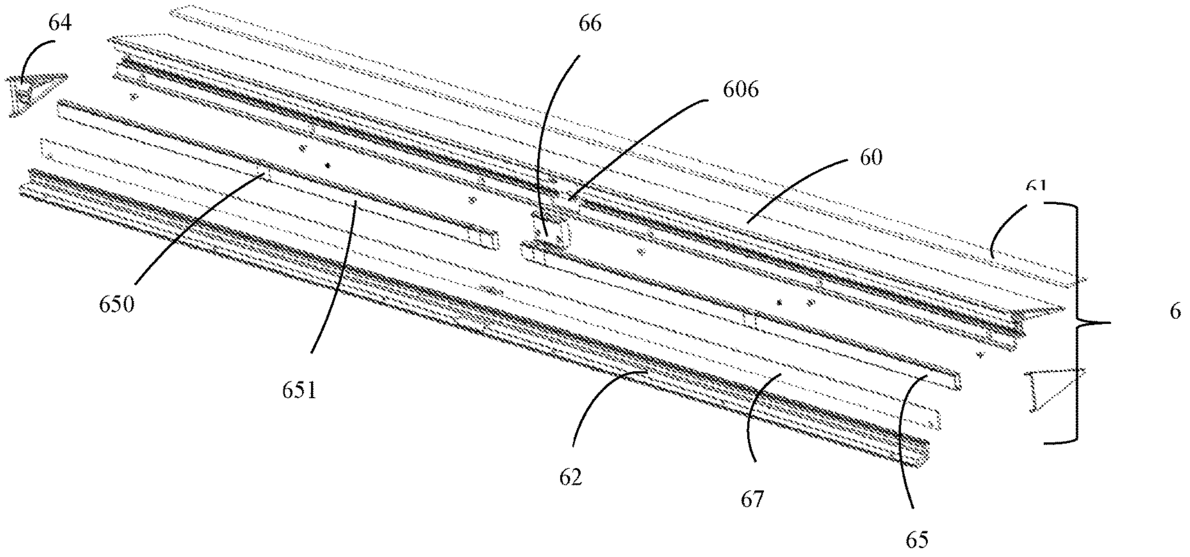
Figure 53:
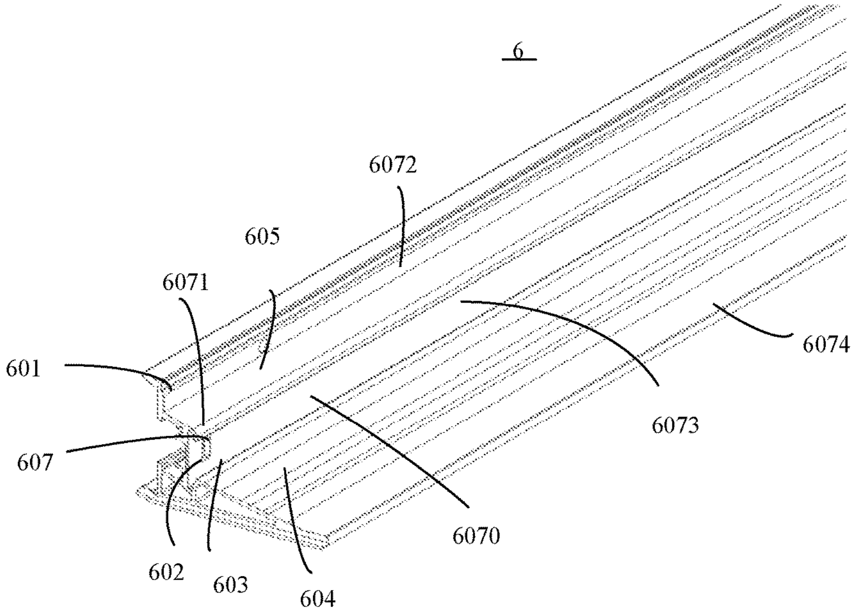
Figure 54:
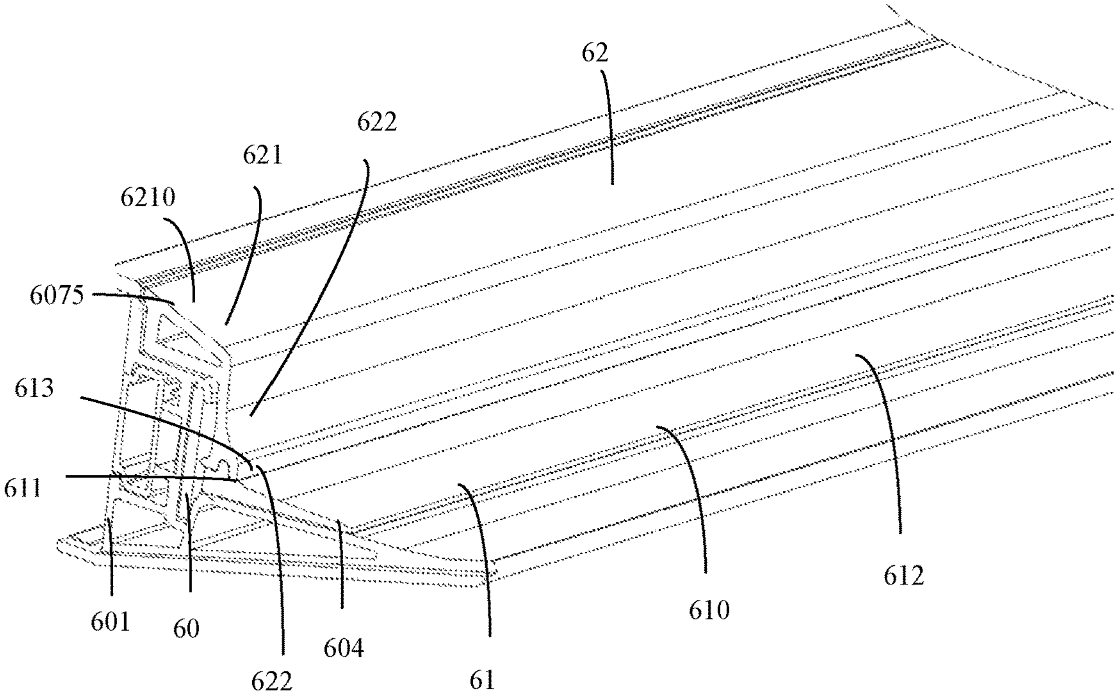
Figure 55:
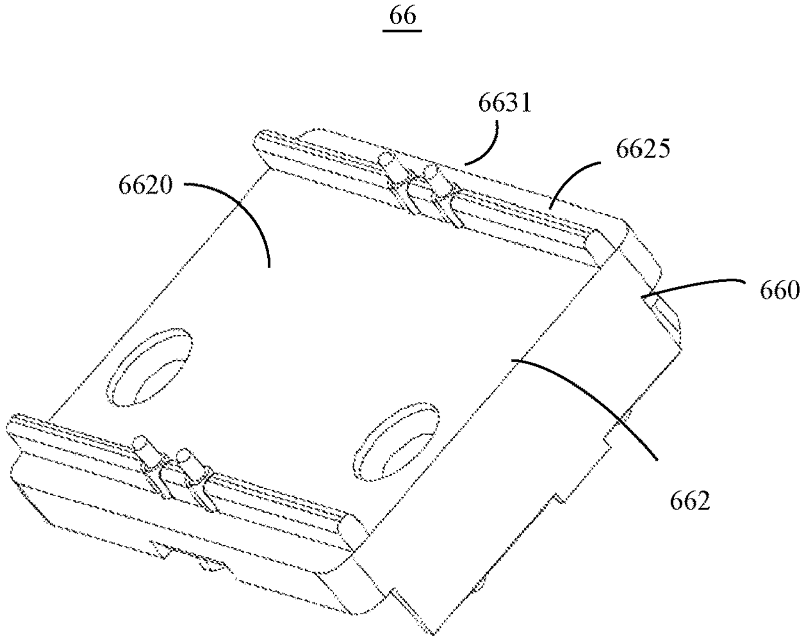
Figure 56:
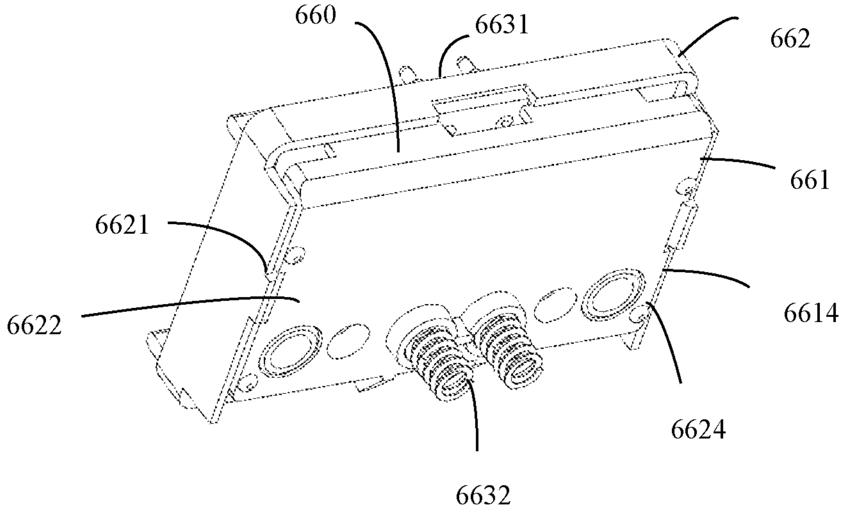
Figure 57:
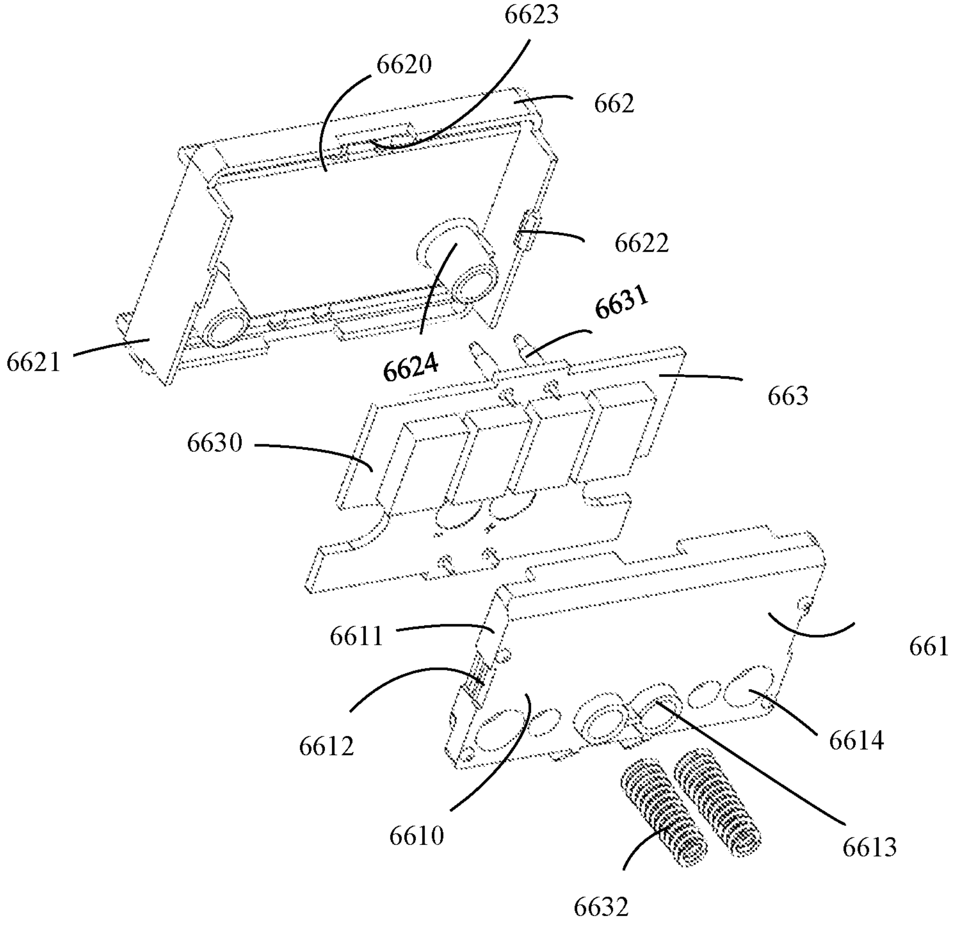
Figure 58:
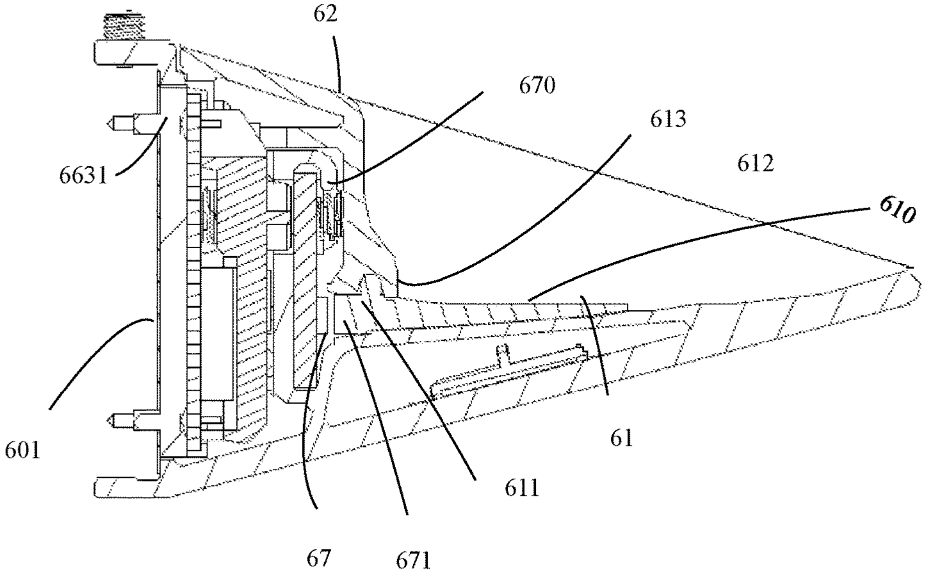
Figure 59:
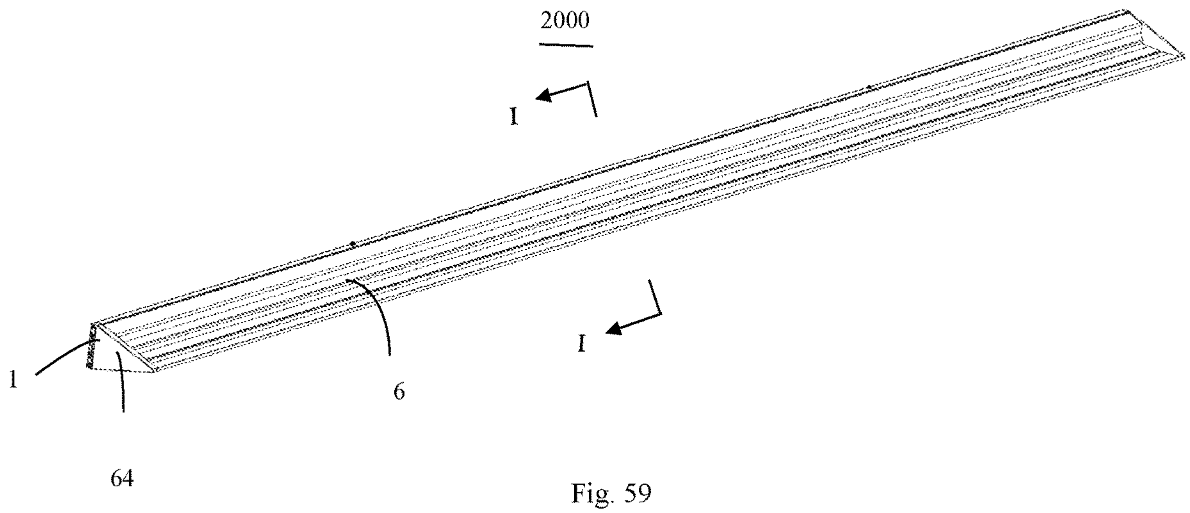
Figure 60:
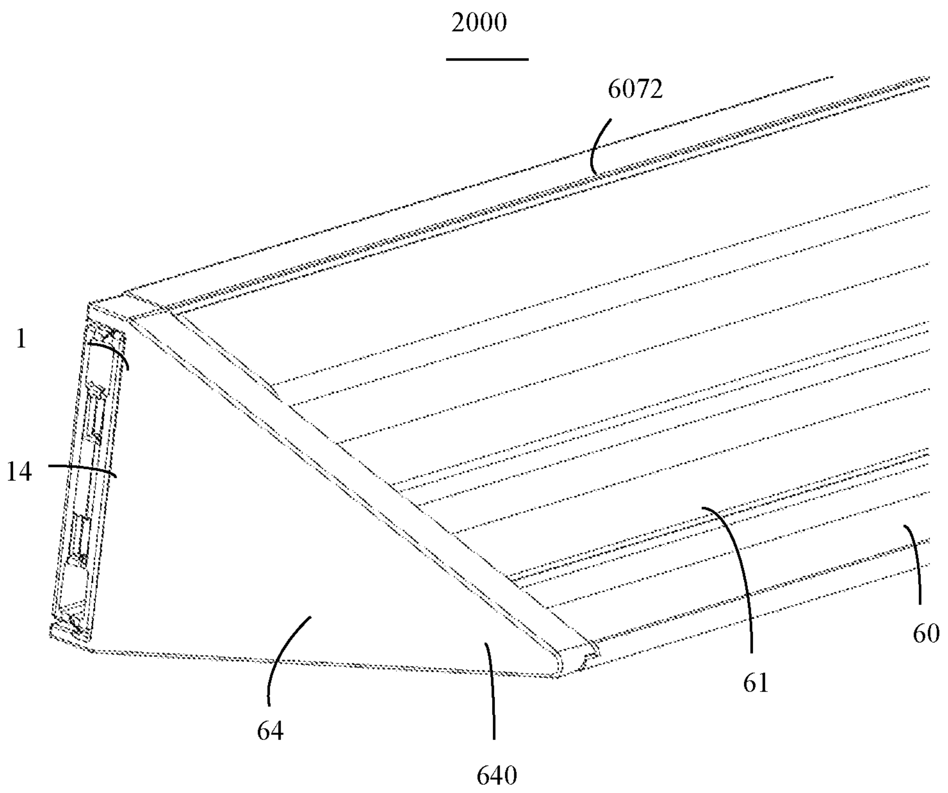
Figure 61:
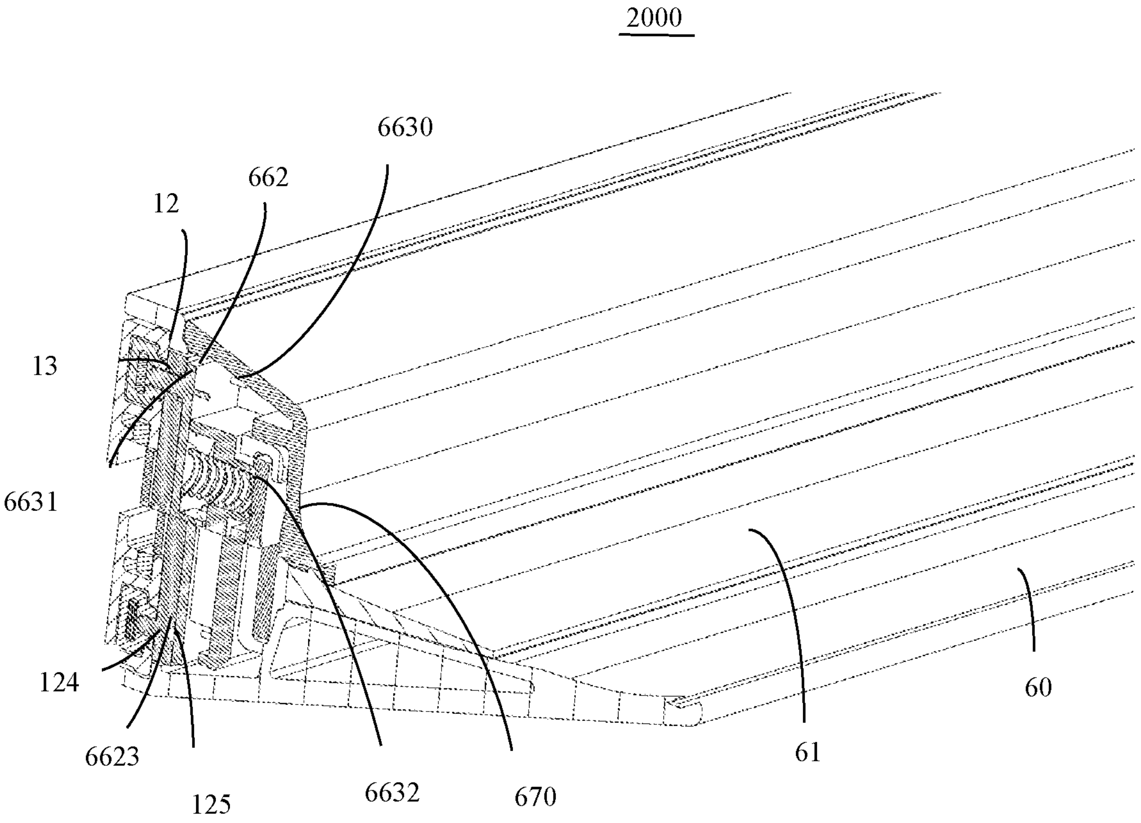

FIG. 1 is a stereoscopic view of a magnetically-adsorbed conductive track provided by an embodiment of the present disclosure;

FIG. 2 is a stereoscopic view of the magnetically-adsorbed conductive track shown in FIG. 1 from another angle;

FIG. 3 is a stereoscopic exploded view of a part of the magnetically-adsorbed conductive track shown in FIG. 1;

FIG. 4 is a stereoscopic exploded view of a part of the magnetically-adsorbed conductive track shown in FIG. 2;

FIG. 5 is a stereoscopic view of an end portion of a magnetically-adsorbed conductive track provided by the embodiment of the present disclosure;

FIG. 6 is a stereoscopic exploded view of the end portion shown in FIG. 5;

FIG. 7 is a stereoscopic view of the end portion shown in FIG. 5 from another angle;

FIG. 8 is a stereoscopic exploded view of the end portion shown in FIG. 7;

FIG. 9 is a cross-sectional view of the magnetically-adsorbed conductive track shown in FIG. 1 along a line A-A;

FIG. 10 is a cross-sectional view of the magnetically-adsorbed conductive track shown in FIG. 1 along a line B-B;

FIG. 11 is a cross-sectional view of the magnetically-adsorbed conductive track shown in FIG. 1 along a line C-C;

FIG. 12 is a stereoscopic view of an adapter according to a first embodiment of the present disclosure;

FIG. 13 is a stereoscopic exploded view of the adapter shown in FIG. 12;

FIG. 14 is a stereoscopic view of a magnetically-adsorbed conductive track system according to the first embodiment of the present disclosure;

FIG. 15 is a stereoscopic view of an adapter according to a second embodiment of the present disclosure;

FIG. 16 is a stereoscopic exploded view of the adapter shown in FIG. 15;

FIG. 17 is a stereoscopic view of a magnetically-adsorbed conductive track system according to the second embodiment of the present disclosure;

FIG. 18 is a stereoscopic view of an adapter according to a third embodiment of the present disclosure;

FIG. 19 is a stereoscopic exploded view of the adapter shown in FIG. 18;

FIG. 20 is a stereoscopic view of a magnetically-adsorbed conductive track system according to the third embodiment of the present disclosure;

FIG. 21 is a stereoscopic view of an adapter according to a fourth embodiment of the present disclosure;

FIG. 22 is a stereoscopic exploded view of the adapter shown in FIG. 21;

FIG. 23 is a stereoscopic view of a magnetically-adsorbed conductive track system according to the fourth embodiment of the present disclosure;

FIG. 24 is a stereoscopic view of an adapter according to a fifth embodiment of the present disclosure;

FIG. 25 is a stereoscopic exploded view of the adapter shown in FIG. 24;

FIG. 26 is a stereoscopic view of a magnetically-adsorbed conductive track system according to the fifth embodiment of the present disclosure;

FIG. 27 is a stereoscopic view of an electrical apparatus that may be collocated with a magnetically-adsorbed conductive track according to the first embodiment of the present disclosure;

FIG. 28 is a stereoscopic exploded view of a part of the electrical apparatus shown in FIG. 27;

FIG. 29 is a stereoscopic view of an electrical system according to the first embodiment of the present disclosure;

FIG. 30 is a cross-sectional view of the electrical system according to the first embodiment of the present disclosure;

FIG. 31 is a partial enlarged view of the cross-sectional view shown in FIG. 30;

FIG. 32 is a stereoscopic view of an electrical apparatus that may be collocated with a magnetically-adsorbed conductive track according to the second embodiment of the present disclosure;

FIG. 33 is a stereoscopic view of the electrical apparatus shown in FIG. 32 from another angle;

FIG. 34 is a cross-sectional view of the electrical apparatus shown in FIG. 32 taken along a line D-D;

FIG. 35 is a stereoscopic exploded view of a part of the electrical apparatus shown in FIG. 32;

FIG. 36 is a stereoscopic exploded view of the electrical apparatus shown in FIG. 32;

FIG. 37 is a stereoscopic exploded view of the electrical apparatus shown in FIG. 33;

FIG. 38 is a stereoscopic view of an electrical connection module of the electrical apparatus shown in FIG. 32;

FIG. 39 is a stereoscopic exploded view of the electrical connection module shown in FIG. 38;

FIG. 40 is a stereoscopic view of the electrical connection module shown in FIG. 38 from another angle;

FIG. 41 is a stereoscopic view of an electrical system according to the second embodiment of the present disclosure;

FIG. 42 is a cross-sectional view of the electrical system shown in FIG. 41 taken along a line E-E;

FIG. 43 is a stereoscopic view of an electrical apparatus that may be collocated with a magnetically-adsorbed conductive track according to the third embodiment of the present disclosure;

FIG. 44 is a stereoscopic exploded view of a part of the electrical apparatus shown in FIG. 43;

FIG. 45 is a cross-sectional view of the electrical apparatus shown in FIG. 43 taken along a line F-F;

FIG. 46 is a stereoscopic view of an electrical connection module of the electrical apparatus shown in FIG. 43;

FIG. 47 is a stereoscopic view of an electrical system according to the third embodiment of the present disclosure;

FIG. 48 is a cross-sectional view of the electrical system shown in FIG. 47 along a line G-G;

FIG. 49 is a stereoscopic view of an electrical apparatus that may be collocated with a magnetically-adsorbed conductive track according to the fourth embodiment of the present disclosure;

FIG. 50 is a stereoscopic view of the electrical apparatus shown in FIG. 49 from another angle;

FIG. 51 is a stereoscopic exploded view of the electrical apparatus shown in FIG. 49;

FIG. 52 is a stereoscopic exploded view of the electrical apparatus shown in FIG. 50;

FIG. 53 is a partially enlarged view of a main body of the electrical apparatus shown in FIG. 51;

FIG. 54 is an enlarged view of a stereoscopic assembly view of a part of the electrical apparatus shown in FIG. 49;

FIG. 55 is a stereoscopic view of an electrical connection module of the electrical apparatus shown in FIG. 49;

FIG. 56 is a stereoscopic view of the electrical connection module shown in FIG. 55 from another angle;

FIG. 57 is a stereoscopic exploded view of the electrical connection module shown in FIG. 56;

FIG. 58 is a cross-sectional view of the electrical apparatus shown in FIG. 49 taken along a line H-H;

FIG. 59 is a stereoscopic view of an electrical system according to the fourth embodiment of the present disclosure;

FIG. 60 is an enlarged view of a part of the electrical system shown in FIG. 59; and FIG. 61 is a cross-sectional view of the electrical system shown in FIG. 59 taken along a line I-I.

DETAILED DESCRIPTION

In order to make objectives, technical details and advantages of the present disclosure apparent, the technical solutions of the present disclosure will be described in a clearly and fully understandable way in connection with specific embodiments of the present disclosure and corresponding drawings. It is obvious that the described embodiments are just a part but not all of the embodiments of the present disclosure. Based on the described embodiments herein, those ordinarily skilled in the art can acquire other embodiment(s), without any inventive work, which should be within the scope of the present disclosure.

When an electrical apparatus is installed on the track to obtain power, the reliability of mechanical and electrical engagement therebetween is also a technical problem to be solved in the prior art. In some instances, after a conductive terminal of the electrical apparatus is assembled to a conductive stripe in the track, if the reliability of the mechanical structure is poor, an electrical connection between the conductive terminal and the conductive stripe will also be affected, which further affects the use of the electrical apparatus.

As shown in FIGS. 1 to 4, and in conjunction with FIGS. 9 to 11, an embodiment of the present disclosure discloses a magnetically-adsorbed conductive track 1, which has an elongate flat shape, and includes a main body portion 10, a magnetic element 11, an insulating portion 12, a conductive portion 13 and end portions 14 arranged at both ends of the main body portion 10.

The main body portion 10 extends along a length direction and has a flat shape, and includes an adsorbing wall 101, a mounting wall 102 arranged parallel and opposite to the adsorbing wall 101, a pair of side walls 103 connecting the adsorbing wall 101 and the mounting wall 102, and a pair of partition walls 104 parallel to the side walls 103 and located between the side walls 103. An outer surface of the adsorbing wall 101 is an adsorbing surface or attraction surface 1010; and an outer surface of the mounting wall 102 is a mounting surface 1020. The side walls 103 and the partition walls 104 as described above, respectively, together with the adsorbing wall 101 and the mounting wall 102, form conductive grooves 105 extending in the length direction and located on both sides, and form an accommodating space 106 located between the conductive grooves 105. Two long and narrow slots 107 are opened in a direction from the adsorbing wall 101 towards the mounting wall 102; the slots 107 are located above the conductive grooves 105 and in communication with the conductive grooves 105. The adsorbing wall 101 located between the slots 107 is further provided with at least two elliptical mounting holes 108 adjacent to both ends; and the number of mounting holes 108 is set according to a length of the magnetically-adsorbed conductive track 1. Corresponding to the mounting hole 108, the magnetic element 11 and the mounting wall 102 are respectively provided with a mounting hole 110 and a mounting hole 109, the three are in communication in a height direction, and the mounting hole 109 of the mounting wall 102 is smaller in size than the mounting hole 110 of the magnetic element 11 and the mounting hole 108 of the adsorbing wall. The mounting holes 108, 109, 110 are used for allowing screws to run there-through; and screw heads are finally pressed on both sides of the mounting hole 109 of the mounting wall 102 and locked with a mounting foundation (a ceiling or a wall) to fix the magnetically-adsorbed conductive track 1 onto the mounting foundation. After the mounting is completed, the mounting hole 108 of the adsorbing wall 101 is blocked and closed by a baffle (not shown); and specifically, the baffle may be provided on a surface of the magnetic element 11 by gluing. In the present disclosure, "adsorbing surface" is used interchangeably with "attraction surface."

The insulating portion 12 is accommodated in the conductive groove 105, and includes a horizontal bottom wall 120, first side walls 121 extending vertically from the bottom wall 120, horizontal walls 123 formed by extending horizontally towards each other from the first side walls 121, and second side walls 122 formed by extending vertically from the horizontal walls 123. A distance between the second side walls 122 is smaller than a distance between the first side walls 121, so that a first space 124 is enclosed by the bottom wall 120 and the first side walls 121; and a second space 125 in communication with the first space 124 is enclosed by the horizontal walls 123 and the second side walls 122. The first space 124 and the second space 125 form an accommodating portion 126 of the insulating portion 12. The first side walls 121 are located between the side walls of the conductive groove 105, that is, located between the side wall 103 and the partition wall 104, and form a face-to-face contact, optimally, an interference fit; and the second side walls 122 are located between the side walls of the slot 107, so that the insulating portion 12 is laid over inner walls of the conductive groove 105 and the slot 107 to provide reliable insulation. A free end of the second side wall 122 is configured to be slightly lower than or flush with the adsorbing surface 1010.

There are two conductive portions 13 with a flat strip shape, i.e., a positive electrode and a negative electrode; the positive electrode and the negative electrode each are inserted into the first space 124 of the insulating portion 12 so as to be located in the conductive groove 105, and each have both ends thereof extending beyond two end faces 100 of the main body portion 10, respectively. A conductive terminal of a lamp that is assembled to the magnetically-adsorbed conductive track 1 by adsorption enters the first space 124 through the second space 125 to form an electrical connection with the conductive portion 13.

The magnetic element 11 has a flat sheet shape, and is inserted into the accommodating space 106 of the main body portion 10 and is at least attached to an inner surface of the adsorbing wall 101 so as to be adsorbed to a magnetic mounting portion of the lamp. Both ends of the magnetic element 11 are located in the accommodating space 106 without extending beyond the two end faces 100 of the main body portion 10. The magnetic element 11 may be respectively attached to the inner surface of the adsorbing wall 101 and the inner surface of the mounting wall 102; in a preferred embodiment of the present disclosure, the magnetic element 11 is attached to the inner surface of the adsorbing wall 101, and two protruding strips 1022 provided on the inner surface of the mounting wall 102 are abutted against a surface of the magnetic element 11 to ensure assembly reliability.

Further referring to FIGS. 5 to 11, the end portions 14 are assembled on both ends of the main body portion 10 and form an electrical connection with the conductive portion 13. The end portion 14 includes an insulating body 140 and a conductive terminal 143 accommodated in the insulating body 140.

There is a pair of conductive terminals 143, and each conductive terminal 143 includes a tabulate base portion 1430 located in a vertical plane, as well as a first docking portion 1431 and a second docking portion 1432 extending from the base portion 1430 towards opposite directions, respectively. The first and second docking portions 1431 and 1432 each include a pair of elastic members extending from upper and lower end edges of the base portion 1430 and bent towards each other; at a position adjacent to free ends, the elastic members are adjacent to each other and the free ends form guiding portions 1433 that are far away from each other.

The insulating body 140 may be integrally formed with the conductive terminal 143, and includes a pair of conductive plug portions 144 formed by extending from a first end face 1403 thereof and a positioning plug portion 145 located between the conductive plug portions 144.

The conductive plug portion 144 is provided with an opening on an end face; guiding portions 1433 of first docking portions 1431 of a pair of conductive terminals 143 are adjacent to the conductive plug portion 144, so that after the end portion 14 is assembled to the main body portion 10, the conductive portion 13 runs through the opening of the conductive plug portion 144 and is assembled between a pair of elastic members of the first docking portion 1431 to form an electrical connection with the conductive terminal 143. One surface of the conductive plug portion 144 further protrudes and extends to be provided with a guiding and positioning portion 1440 which is a pair of protruding strips whose width is equivalent to that of the slot 107; when the end portion 14 is assembled with the main body portion 10, the guiding and positioning portion 1440 enters into the slot 107. The positioning plug portion 145 is inserted into the accommodating space 106 and abutted against the end portion of the magnetic element 11 to provide positioning of the magnetic element 11 in the length direction.

The insulating body 140 has a pair of positioning holes 146 that are formed by sinking from the second end face 1404 thereof towards the first end face 1403 and are located on an outer side, and a pair of conductive plug holes 147 located between the positioning holes 146 and adjacent to the positioning holes 146. The second docking portion 1432 is configured such that the guiding portion 1433 thereof is accommodated in the conductive plug hole 147 and is used to form an electrical connection with the adapter 2 (shown in the figures) so as to be electrically connected with other magnetically-adsorbed conductive track.

The insulating body 140 further includes a first surface 1401 and an opposite second surface 1402, which are respectively flush with the adsorbing surface 1010 and the mounting surface 1020 of the main body portion 10 to form a smooth and flat structure to facilitate height reduction.

In a preferred embodiment of the present disclosure, the insulating body 140 is formed by collocating (assembling, combining, and matching) a first housing body 141 with a second housing body 142 arranged in up and down directions; and the conductive terminal 143 is sandwiched and accommodated between the first housing body 141 and the second housing body 142. The first surface 1401 is provided on the first housing body 141; and the second surface 1402 is provided on the second housing body 142. Therefore, the above-described structures are all formed by combining the first housing body 141 with the second housing body 142.

Specifically, the first housing body 141 extends from a surface thereof opposite to the first surface 1401 to form two conductive terminal accommodating grooves 1410, each conductive terminal accommodating groove 1410 includes two staggered cavities 1412 which are respectively in communication with the conductive plug portion 144 and the conductive plug hole 147 arranged in a staggered manner, to respectively accommodate the first docking portion 1431 and the second docking portion 1432 of the conductive terminal 143. Between the two conductive terminal accommodating grooves 1410 adjacent to the first end face 1403, a pair of positioning elements 1411 and a positioning plug portion 145 protruding and extending from the first end face 1403 are provided; the positioning elements 1411 may be a pair of positioning posts formed by protruding and extending along a height direction, or may also be positioning elements formed with positioning grooves. A positioning hole 146 is formed between the two conductive terminal accommodating grooves 1410 adjacent to the second end face, and the side wall.

Correspondingly, the second housing body 142 is provided with a partition wall 1422 for forming two cavities 1420, which cooperate with the conductive terminal accommodating groove 1410 to accommodate the conductive terminal 143; and a positioning element 1421 is formed inside the cavity 1420 and is matched with the positioning element 1411 of the first housing body 141. The cavity 1420 is respectively in communication with the conductive plug portion 144, the conductive plug hole 147 and the positioning hole 146.

In summary, the magnetically-adsorbed conductive track 1 provided by the present disclosure is respectively in direct face-to-face contact with the adsorbing surface of the lamp and the mounting foundation through the adsorbing surface 1010 and the mounting surface 1020, which effectively reduces the height of the magnetically-adsorbed conductive track 1; the conductive terminal 143 with flat structure design extending in opposite directions can effectively reduce the height of the end portion 14; the first surface 1401 and the second surface 1402 of the end portion 14 may be respectively flush with the adsorbing surface 1010 and the mounting surface 1020; and the overall structure of the magnetically-adsorbed conductive track 1 is simple, which achieves ultra-thin structure design, and effectively reduces costs.

In order to flexibly arrange the magnetically-adsorbed conductive tracks 1 provided by the present disclosure, varied arrangements may be achieved to meet different needs; the present disclosure further provides an adapter 2, as shown in FIGS. 12 to 26, the adapter 2 has varied forms, and can achieve cascaded connections of the magnetically-adsorbed conductive tracks 1 such as a straight-line connection, a planar L-shaped connection, a vertical L-shaped connection, a cross-shaped connection, and a T-shaped connection. A system consisting of the adapter 2 and at least two magnetically-adsorbed conductive tracks 1 is a magnetically-adsorbed conductive track system 1000. The adapter 2 achieves a mechanical and electrical connection with the magnetically-adsorbed conductive tracks 1; and the adapter 2 is flush with the mounting surfaces 1020 and the first surfaces 1401 of the end portions 14 of the magnetically-adsorbed conductive tracks 1 after the magnetically-adsorbed conductive tracks 1 are cascaded, and is respectively attached with the surfaces of the mounting foundation. Therefore, a thickness of the magnetically-adsorbed conductive track system 1000 is very small, which achieves ultra-thin structure design.

In other embodiments, the adapter 2 is not limited to the function of cascading magnetically-adsorbed conductive tracks 1, and may also cascade other electrical apparatuses.

Corresponding to the above cascading mode, the adapter 2 has varied structures, which will be described below respectively.

Referring to FIGS. 12 to 26, the adapter 2 includes an insulating body 20, and a conductive terminal 23 provided in the insulating body 20 and partially protruding and extending from the insulating body 20 to form an electrical connection with the end portion 14 of the magnetically-adsorbed conductive track 1. The insulating body 20 may be integrally formed with the conductive terminals 23, or may also include a first body 21 and a second body 22 collocated (assembled, combined, and matched) with the first body 21 along the height direction; and the conductive terminal 23 is sandwiched between the first body 21 and the second body 22. The insulating body 20 is of a square shape with four side edges; the insulating body 20 has a first surface 204 and an opposite second surface 206, and at least includes a main body portion 201 and a guiding portion 202 formed by extending from the main body portion 201. The conductive terminal 23 at least includes a base portion 231, and a docking portion 232 formed by extending from the base portion 231 and protruding beyond the main body portion 201 of the insulating body 20. The guiding portion 202 of the insulating body 20 is provided adjacent and arranged in parallel to the docking portion 232, so as to guide and protect the docking portion 232. When the adapter 2 is docked with end portions 14 of different magnetically-adsorbed conductive tracks 1, the guiding portion 232 is assembled into the positioning hole 146, and meanwhile the docking portion 232 enters the end portion 14 from the positioning plug portion 145 and forms an electrical connection with the second docking portion 1432 of the conductive terminal 143. In order to accommodate the conductive terminal 23, the first body 21 and the second body 22 each are formed with an accommodating space 24 located in a middle portion and a plurality of accommodating channels 25 in communication with the accommodating space 24, the accommodating space 24 is used for accommodating the base portion 231 of the conductive terminal 23; and the docking portion 232 is partially accommodated in the accommodating channel 25 and extends beyond the insulating body 20. Therefore, after assembling, the first surface 204 of the adapter 2 is flush with the mounting surface 1020 and the first surface 1401 of the end portion 14 of the magnetically-adsorbed conductive track 1, and all these surfaces are attached to the surface of the mounting foundation. The second surface 206 of the adapter 2 is flush with the adsorbing surface 1010 and the second surface 1402 of the end portion 14 of the magnetically-adsorbed conductive track 1, so that the overall structure is smooth, flat and simple, and the overall height is reduced.

Specifically, according to different cascading forms, the adapter 2 has different structures. As shown in FIGS. 12 to 14, if the magnetically-adsorbed conductive tracks 1 are connected in a cross shape, the adapter 2 includes a quadrilateral insulating body 20, and a pair of guiding portions 202 formed by extending from each side edge of the insulating body 20 and close to both ends of the insulating body 20. The conductive terminal 23 includes a quadrilateral base portion 231, and four groups of docking portions 232 formed by respectively extending in parallel from each side edge of the base portion 231; and each docking portion 232 is adjacent to its own guiding portion 202 and located between a pair of guiding portions 202 located on a same side. The docking portions 232 are arranged in pairs, i.e., a positive electrode and a negative electrode, respectively. Therefore, the adapter 2 may form a mechanical and electrical connection with the end portions 14 of four magnetically-adsorbed conductive tracks 1, respectively, and the four magnetically-adsorbed conductive tracks 1 are arranged in a cross shape to form a cross-shaped magnetically-adsorbed conductive track system 1000.

Referring to FIGS. 15 to 17, if the magnetically-adsorbed conductive tracks 1 are connected in a horizontal, straight-line shape, the adapter 2 includes a quadrilateral insulating body 20 and mutually parallel guiding portions 202 extending from opposite two side edges of the insulating body 20. The conductive terminal 23 includes a quadrilateral base portion 231 and mutually parallel docking portions 232 extending from opposite two side edges of the base portion 231. Therefore, the adapter 2 may form a mechanical and electrical connection with the end portions 14 of the two magnetically-adsorbed conductive tracks 1, respectively, and the two magnetically-adsorbed conductive tracks 1 are arranged in a cross shape to form a cross-shaped magnetically-adsorbed conductive track system 1000.

Referring to FIGS. 18 to 20, if the magnetically-adsorbed conductive tracks 1 are connected in a planar L shape, the adapter 2 includes a quadrilateral insulating body 20 and mutually parallel guiding portions 202 formed by extending from adjacent two side edges of the insulating body 20. The conductive terminal 23 includes a quadrilateral base portion 231 and mutually parallel docking portions 232 formed by extending from adjacent two side edges of the base portion 231. Therefore, the adapter 2 may form a mechanical and electrical connection with end portions 14 of two magnetically-adsorbed conductive tracks 1, respectively, and the two magnetically-adsorbed conductive tracks 1 are arranged in an L shape in a plane to form an L-shaped magnetically-adsorbed conductive track system 1000.

Referring to FIGS. 21 to 23, if the magnetically-adsorbed conductive tracks 1 are connected in an L shape in mutually perpendicular planes, the adapter 2 includes an L-shaped insulating body 20; and the insulating body 20 includes a flat plate-shaped first body 21 located in a horizontal plane and an L-shaped second body 22 assembled with the first body 21. The guiding portion 202 is formed by extending from a side wall of the first body 21 and extending from a side wall of a vertical portion of the second body 22, respectively. The conductive terminal 23 includes a first conductive terminal 233 located in a horizontal plane and a second conductive terminal 234 located in a vertical plane that is arranged perpendicular to the first conductive terminal 233. Each of the first conductive terminal 233 and the second conductive terminal 234 is formed with mutually parallel docking portions 232 extending from a horizontal side edge and a vertical side edge thereof, respectively. The other horizontal side edge of the first conductive terminal 233 extends to be formed with a protruding portion 2330; and the second conductive terminal 234 is correspondingly provided with an opening 2340 to accommodate the protruding portion 2330, so as to form an electrical connection there-between. In other embodiments, positions of the opening 2340 and the protruding portion 2330 may be interchanged. The first conductive terminal 233 is sandwiched and accommodated between horizontal portions of the first body 21 and the second body 22; the second conductive terminal 234 is accommodated in a vertical portion of the second body 22. Therefore, the adapter 2 may form a mechanical and electrical connection with end portions 14 of two magnetically-adsorbed conductive tracks 1, respectively, which are located in the horizontal plane and the vertical plane, respectively; and the two magnetically-adsorbed conductive tracks 1 are arranged in an L shape located in different planes to form a stereoscopic L-shaped magnetically-adsorbed conductive track system 1000. In this embodiment, the first surface 204 is an upper surface of the first body 21; and the second surface 206 is a rear surface of the second body 22. In the assembled L-shaped magnetically-adsorbed conductive track system 1000, the first surface 204 is flush with a mounting surface 1020 of a main body portion 10 and a first surface 1401 of an end portion 14 of one of the magnetically-adsorbed conductive tracks 1, and is flush with and attached to a horizontal surface of the mounting foundation; the second surface 206 is flush with a mounting surface 1020 of a main body portion 10 and a first surface 1401 of an end portion 14 of the other conductive track 1, and is flush with and attached to a vertical surface of the mounting foundation.

Referring to FIGS. 24 to 26, if the magnetically-adsorbed conductive tracks 1 are connected in a T shape, the adapter 2 includes a quadrilateral insulating body 20 and mutually parallel guiding portions 202 formed by extending from three consecutive side edges of the insulating body 20. The conductive terminal 23 includes a quadrilateral base portion 231 and mutually parallel docking portions 232 formed by extending from three consecutive side edges of the base portion 231. Therefore, the adapter 2 may form a mechanical and electrical connection with end portions 14 of three magnetically-adsorbed conductive tracks 1, respectively, and two magnetically-adsorbed conductive tracks 1 are arranged in a T shape to form a T-shaped magnetically-adsorbed conductive track system 1000.

The magnetically-adsorbed conductive tracks 1 cascaded through the adapter 2 may be magnetically adsorbed to various electrical apparatuses and achieve electrical connections therewith, which is convenient and reliable. Several types of electrical apparatuses 3, 4, 5 and 6 that may be connected with the magnetically-adsorbed conductive track 1 are enumerated below; and the electrical apparatuses 3, 4, 5, 6 and the magnetically-adsorbed conductive tracks 1 constitute electrical systems 2000. The electrical apparatuses 3, 4, 5, 6 may be driving power supplies or lighting fixtures, intelligent control apparatuses or sensor modules, etc., among which a driving power supply 3 may receive mains power and convert the same into power required by the electrical apparatuses such as lighting fixtures 4, 5, 6 or intelligent control apparatuses or sensor modules; and the electrical apparatuses such as the lighting fixtures 4, 5, 6 or the intelligent control apparatuses or the sensor modules may also be provided with a driving apparatus to achieve power conversion. Moreover, in other embodiments, the electrical apparatus is not limited to the types as described above, and may also be any electrical apparatus configured to be matched with the above-described magnetically-adsorbed conductive track 1.

Referring to FIGS. 27 to 31, the electrical apparatus according to the first embodiment of the present disclosure is a driving power supply 3 that may be collocated with the magnetically-adsorbed conductive track 1 and supply power thereto. The driving power supply 3 and the magnetically-adsorbed conductive track 1 constitute an electrical system 2000 according to the first embodiment of the present disclosure.

The driving power supply 3 includes a main body portion 30, an electrical connection module 32, a conductor 33, and a driving module 34.

The driving module 34 includes various circuit modules (not numbered) and a control module, a Bluetooth module or a Wifi module 35 (for example, a control module may be integrated with a Bluetooth module or a Wifi module); the driving module 34 has a circuit board (not numbered) provided with the above-described modules; the circuit board is electrically connected with the conductor 33 and the electrical connection module 32, respectively; the conductor 33 is electrically connected with external mains for supplying power to the driving power supply 3; the circuit board of the driving module 34 is electrically connected with the electrical connection module 32 through the conductor; and the electrical connection module 32 is assembled to the driving module 34 and is attached by adsorption to the magnetically-adsorbed conductive track 1 to form an electrical connection, so that the driving power supply 3 supplies power to the magnetically-adsorbed conductive track 1 and other lamps.

The electrical connection module 32 includes a housing body 32 formed by extending in a longitudinal direction, as well as a magnet module 323 and a conductive module 324 accommodated in the housing body 32. The housing body 32 includes a first housing body 321 and a second housing body 322 assembled with the first housing body 321 along a height direction; and the magnet module 323 and the conductive module 324 as described above are accommodated between the first housing body 321 and the second housing body 322.

The first housing body 321 and the second housing body 322 are hollowed; and after these two are collocated with each other, an accommodating space for accommodating the magnet module 323 and the conductive module 324 is formed. An opening is provided at one end of the first housing body 321 and the second housing body 322 for the conductor 33 to run therethrough. The magnet module 323 is composed of a plurality of pieces, arranged at intervals in the accommodating space and close to the second housing body 322, so as to adsorb the magnetic element 11 of the magnetically-adsorbed conductive track 1; after assembly, the surface of the second housing body 322 is attached to the adsorbing surface 1010 of the magnetically-adsorbed conductive track 1. The second housing body 322 is L-shaped, and a portion of the second housing body 322 provided with the opening for the conductor 33 to run therethrough is raised to form a raised portion 3222, thereby forming a height difference with the base portion 3223. In a preferred embodiment of the present disclosure, an outer surface 32230 of the base portion 3223 that faces the adsorbing surface 1010 of the magnetically-adsorbed conductive track 1 protrudes and extends to be provided with a strip-shaped collocating portion 3220 formed by extending along the above-described longitudinal direction; and the outer surface 32230 serves as a collocating surface. Corresponding to a position of the conductive module 324, the collocating portion 3220 has a plurality of grooves 3221 formed at intervals as conductive terminal accommodating portions 3221; and the conductive terminals 3241 are partially accommodated in the grooves 3221 and extend beyond the collocating portion 3220.

The conductive module 324 is located between the magnet modules 323. The conductive module 324 includes a circuit board 3240, and a conductive terminal 3241 provided on a surface of the circuit board 3240; the first conductive terminal 3241 is electrically connected with a built-in circuit of the circuit board 3240, and is electrically connected with the circuit board of the driving module 34 through the conductor, so as to obtain an electric current transferred from the mains supply through the conductor 33 and transformed by the circuit board of the driving module 34. In other embodiments, the conductive module 324 may also be connected to the circuit board of the driving module 34 by providing another group of conductive terminals.

After the driving power supply 3 is assembled by adsorption to the magnetically-adsorbed conductive track 1, the end portion 14 of the magnetically-adsorbed conductive track 1 abuts against one end of the raised portion 3222; and the magnetically-adsorbed conductive track 1 is located above the base portion 3223 and is flush with the surface of the raised portion 3222, to form a smooth and flat, simple and ultra-thin configuration of the magnetically-adsorbed conductive track 1. Then, through the electrical connection between the first conductive terminal 3241 and the conductive portion 13 of the magnetically-adsorbed conductive track 1, the magnetically-adsorbed conductive track 1 is supplied with power. The first conductive terminal 3241 is elastic pin-like and retractable; the collocating portion 3220 and the first conductive terminal 3241 jointly extend into the second space 125 of the insulating portion 12; and after entering the second space 125 from the first space 124 of the insulating portion 12 of the magnetically-adsorbed conductive track 1, the first conductive terminal 3241 is abutted against the surface of the conductive portion 13 and is compressed to exert a reaction force to ensure a reliable electrical connection therebetween. The collocating surface 32230 of the base portion 3223 is attached to the adsorbing surface 1010 of the magnetically-adsorbed conductive track 1; and the magnet module 323 is adsorbed to the magnetic element 11 behind the adsorbing surface 1010 to bind the driving power supply 3 with the magnetically-adsorbed conductive track 1. The collocating portion 3220 that is assembled, together with the conductive terminal 3241, into the magnetically-adsorbed conductive track 1 enhances a binding force of the driving power supply 3 and the magnetically-adsorbed conductive track 1; the collocating surface 32230 that is attached to the adsorbing surface 1010 ensures a lowest height of the electrical system 2000, and an effective adsorption between the magnet module 323 and the magnetic element 11. Therefore, the driving power supply 3 provided by the present disclosure may be adsorbed to the magnetically-adsorbed conductive track 1 and electrically connected with the conductive portion 13 to achieve a mechanical connection and a power supply, which is convenient for use.

Referring to FIGS. 32 to 42, the electrical apparatus according to the second embodiment of the present disclosure is a lighting fixture 4, which may be assembled by adsorption to the magnetically-adsorbed conductive track 1 and achieve an electrical connection with the magnetically-adsorbed conductive track 1 to supply power to the lighting fixture 4. In a preferred embodiment of the present disclosure, the lighting fixture 4 is a linear lamp, generally referred to as a line lamp. The lighting fixture 4 and the magnetically-adsorbed conductive track 1 constitute an electrical system 2 according to the second embodiment of the present disclosure.

The lighting fixture 4 includes: a lamp body 40 formed by extending in a longitudinal direction; a reflective layer 41, a light guide element 42 and a cover 43 sequentially arranged on the lamp body 40 along a height direction; and an end cap 44 arranged at both ends of the lamp body 40. In a preferred embodiment of the present disclosure, the cover 43 is a diffuser plate which uniforms the light. The end caps 44 are fastened to both ends of the lamp body 40 by screws, but it is not limited thereto. It also includes a magnet module 45, an electrical connection module 46 and a lighting module 47, which are accommodated in the lamp body 40.

In order to accommodate the magnet module 45, the electrical connection module 46 and the lighting module 47, the lamp body 40 includes a bottom wall 401, a pair of side walls 402 formed by extending from the bottom wall 401, and a top wall 403 formed by extending from the other ends of the side walls 402 towards each other. Two partition portions 404 are formed along a length direction from a region of the bottom wall 401 that is adjacent to the side walls 402. The partition portions 404 are parallel to the side walls 402 and divide the lamp body 40 into three regions; two lighting module accommodating portions 405 formed between the partition portions 404 and the side walls 402, and a magnet module accommodating portion 406 located between the partition portions 404, are used for accommodating the lighting module 47 and the magnet module 45, respectively. In order to accommodate the electrical connection module 46, an opening 4010 is formed in a middle portion of the bottom wall 401, and the opening is in clamping collocation with the electrical connection module 46. Due to existence of the opening 4010, the partition portion 404 is divided into two parts along the length direction; correspondingly, the magnet module 45 has two portions, which are respectively accommodated in the magnet module accommodating portions 406, and are spaced apart by the opening 4010 and by the electrical connection module 46 accommodated in the opening 4010.

The magnet module 45 includes two strip-shaped, fixed portions 450, a plurality of pairs of positioning elements 4501 are arranged on a surface of the magnet module 45, groups of magnets 451 are stacked in parallel between the positioning elements 4501, and all of which are accommodated in the magnet module accommodating portion 406.

The lighting module 47 includes an elongated light source substrate 470, as well as a plurality of light sources 471 and at least two electrodes 472 arranged on the light source substrate 470; the light sources 471 and the electrodes 472 are respectively arranged along the height direction; in a preferred embodiment of the present disclosure, the electrodes 472 are arranged in the middle of a lower part of the light source substrate 470 and include a positive electrode and a negative electrode; in other preferred embodiments, it may also include electrodes for transmitting various control signals, for dimming and for color adjustment. The lighting module 47 is accommodated in at least one of the lighting module accommodating portions 405; and in other embodiments, two groups of lighting modules 47 may be provided and be respectively accommodated in a group of lighting module accommodating portions 405 adjacent to the side walls 402.

The top wall 403 and a surface of the partition wall 404 that faces the top wall 403 have a height difference therebetween, to form an optical element accommodating space 407; the reflective layer 41, the light guide element 42 and the cover 43 as described above are respectively accommodated in the optical element accommodating space 407, and are sandwiched between the top wall 403 and the partition wall 404. After assembly, the light source 471 of the lighting module 47 faces the side wall of the light guide element 42, so that light emitted from the light source 471 enters the inside of the light guide element 42 from the side wall of the light guide element 42, undergoes multiple reflections by the upper and the lower surfaces, and then exits from at least one surface, e.g., the light exits from a surface facing the cover 43 in this embodiment; and the reflective layer 41 is located on the other surface of the light guide element 42, and reflects the light incident on the other surface to re-enter the light guide element 42 to increase light effect.

The electrical connection module 46 is assembled in the opening 4010, and includes a housing body 460 and an electrical connector 463 which are formed by extending in the longitudinal direction; the housing body 460 includes a first housing body 461, a second housing body 462, and an electrical connector 463 arranged between the first housing body 461 and the second housing body 462.

The electrical connector 463 includes a base body 4630 with a built-in circuit, two pairs of first conductive terminals 4631 provided on the base body 4630, and one pair of second conductive terminals 4632 provided on the base body 4630. In the embodiment of the present disclosure, the first conductive terminal 4631 and the second conductive terminal 4632 are both elastic pin-like conductive terminals, with springs arranged therein; after subjecting to a force, the spring is compressed and exerts a restoring force to increase the reliability of an electrical connection. At least one pair of first conductive terminals 4631 may be provided and used for an electrical connection between the lighting fixture 4 and the conductive portion 13 after the lighting fixture 4 is assembled to the magnetically-adsorbed conductive track 1. Two groups of first conductive terminals 4631 are respectively arranged at four corners of the base body 463 to be perpendicular to the base body 463 by adopting perforation welding or other connecting modes such as surface welding, and are electrically connected with circuits inside the base body 463. The second conductive terminal 4632 is connected with and parallel to one surface of the base body 463 by surface welding or other connecting modes, and is electrically connected with circuits inside the base body 463, so as to be electrically connected with the first conductive terminal 4631. The second conductive terminal 4632 is elastically abutted against the electrode 472 of the lighting module 47 to form an electrical connection, so that after the first conductive terminal 4631 obtains power from the magnetically-adsorbed conductive track 1, current is transmitted to the second conductive terminal 4632 through a wiring of the base body 463 to further supply power to the lighting module 47; and meanwhile, the magnet 451 of the magnet module 45 is adsorbed to the adsorbing wall 101 of the magnetically-adsorbed conductive track 1.

The first housing body 461 and the second housing body 462 are engaged with each other in a snap-fit manner, and are engaged with the opening 4010 of the lighting fixture 4 in a snap-fit manner. The second housing body 462 includes a bottom wall 4620 and a pair of side walls 4621 formed by extending in a direction from both sides of the bottom wall 4620 towards the first housing body 461. A middle portion of the side wall 4621 is broken and folded outwards to form a snap-fitting portion 4622, which is engaged with a peripheral wall of the opening 4010 in a snap-fit manner. Four corners of the bottom wall 4620 are provided with four round holes for the first conductive terminals 4621 to run therethrough, and a surface of the bottom wall 4620 that faces the magnetically-adsorbed conductive track 1 protrudes and extends so as to be formed with a plurality of collocating portions 4623; the first conductive terminal 4631 is located between the collocating portions 4623 and extends beyond the collocating portions 4623; the collocating portions 4623 may protect the first conductive terminals 4631, and extend, together with the first conductive terminals 4631, into the second space 125 of the magnetically-adsorbed conductive track 1; and the first conductive terminal 4631 further enters the first space 124 and be elastically abutted against the conductive portion 13 to form an electrical connection. In addition, the bottom wall 4620 is attached to the adsorbing surface 1010 of the magnetically-adsorbed conductive track 1; and the magnet 451 adsorbs the magnetic element 11 behind the adsorbing surface 1010. The second conductive terminal 4632 partially extends beyond the side walls of the first housing body 461 and the second housing body 462 that are arranged perpendicular to the side walls 4621, and is used for elastically abutting against the electrode 472 of the lighting module 47. The collocating portions 4623 are assembled into the magnetically-adsorbed conductive track 1 together with the first conductive terminal 4631, which enhances a binding force of the magnetically-adsorbed conductive track 1 and the lighting fixture 4, ensures sufficiently small height and small thickness of the electrical system 2000, and achieves a simple structure.

Now referring to FIGS. 43 to 48, the present disclosure further provides a lighting fixture 5 assembled by adsorption to the magnetically-adsorbed conductive track 1 according to a third embodiment of the present disclosure; and in the embodiment of the present disclosure, the lighting fixture 5 is a grid lamp. The lighting fixture 5 and the magnetically-adsorbed conductive track 1 constitute an electrical system 2000 according to the third embodiment of the present disclosure.

The lighting fixture 5 includes a lamp body 50, a cover 53 assembled on the lamp body 50, a lighting module 57 accommodated between the lamp body 50 and the cover 53, an electrical connection module 51 pivotally coupled to the lamp body 50, and a rotating shaft 52 sleeved between the electrical connection modules 51 and the lamp body 50.

The lighting module 57 includes a light source substrate 570, a light source 571 provided on the light source substrate 570, a primary optical element 572 covering an outer side of the corresponding light source 571, and a secondary optical element 573 located at one end of the primary optical element 572. In the embodiment of the present disclosure, the light source may be an LED particle or a COB light source; the primary optical element 572 is a reflector, which is fixed on the light source substrate 570, has one end covering the light source 571 and the other end used as a light exit; the secondary optical element 573 has a flat plate shape and is located at the light exit of the reflector 572; the secondary optical element 573 is provided with a plurality of polarizer structures at intervals to expand a light exiting angle of the light from the light exit of the reflector 572 in a lateral direction.

The cover 53 includes a main body portion 530, a plurality of grids 531 are provided inside the main body portion 530, and the number of the grids 531 is corresponding to the number of reflectors 572. The main body portion 530 extends beyond the grids 531, and a plurality of snap-fitting portions 532 are formed at intervals on the outer periphery of the side wall of the main body portion 530; the cover 53, after being assembled to the lamp body 50, is connected with the snap-fitting portion 501 of the inner wall of the lamp body 50 in a snap-fitting manner; in the embodiment of the present disclosure, the snap-fitting portion 530 of the cover 53 is a hooker; the snap-fitting portion 501 of the lamp body 50 is a recess formed therein; and the hooker and the recess may be interchanged. The secondary optical element 573 is sandwiched between the primary optical element 572 and the grids 531. The grid 531 has one end provided with an opening as a light entry to correspondingly receive incident light from a lens module, and the other end also provided with an opening as a light exit; and the side wall of the grid extends into a horn shape. A range of the above-described emergent light passing through the secondary optical element 573 is equivalent to a horn mouth for light to exit.

The electrical connection module 51 includes a housing body 510 extending in the longitudinal direction, a driving portion 58 accommodated in the housing body 510, a conductive module 56 and a magnet module 55. The housing body 510 includes a main body portion 54, a cap body 59 assembled on the main body portion 54, a driving portion 58, a conductive module 56 and a magnet module 55 accommodated between the main body portion 54 and the cap body 59.

The main body portion 54 includes a rectangular frame body 540 and a semicircular pivot portion 541 formed by protruding and extending from one end face of the frame body 540. A circular, rotating shaft hole 5410 is formed on one lateral end face of the pivot portion 541. Correspondingly, the lamp body 50 also protrudes and extends to be provided with a semicircular pivot portion 502, and is formed with a rotating shaft hole (not numbered), so that both ends of the above-described rotating shaft 52 are respectively accommodated in the rotating shaft hole 5410 and the rotating shaft hole of the pivot portion 502 of the lamp body 50; the adapting module 54 and the lamp body 50 may be rotated relative to each other, so that the range of the emergent light of the lighting module 57 of the lamp body 50 may be adjusted.

The conductive module 56 includes a flat plate-shaped base body 560 with built-in circuits, two pairs of elastic pin-like conductive terminals 561 formed by extending from a surface of the base body 560, and a pair of mounting holes 562 formed in a middle portion of the base body 560 and located between the two pairs of elastic pin-like conductive terminals 561. The conductive terminal 561 has a built-in spring that may be compressed to increase the reliability of an electrical connection after it is electrically connected with the magnetically-adsorbed conductive track 1; and the conductive terminal 561 is also electrically connected with the built-in circuit of the base body 560. In order to provide the power obtained from the magnetically-adsorbed conductive track 1 to the lighting module 57, the conductive module 56 needs to be electrically connected with the driving portion 58; in the embodiment of the present disclosure, the base body 560 of the conductive module 56 is electrically connected with the driving portion 58 through a conductor (not shown); however, in other embodiments, the base body 560 may also be provided with an elastic pin-like conductive terminal 561 relative to the other surface where the conductive terminal 561 is provided; and the driving portion 58 is provided, on a circuit board thereof, with a conductive sheet to be abutted against the elastic pin-like conductive terminal to form an electrical connection. The driving portion 58 is electrically connected with the lighting module 57 through a conductor, to convert the mains power to the power required by the lighting module 57 and supply the same to the lighting module 57. Since the driving power supply 3 converts the mains power into a 58 V power supply, the lighting fixture 5 needs to be provided with a driving portion 58 to further convert the 58 V power supply into a voltage required by the lighting fixture 5.

Two groups of magnet modules 55 are provided, and each include at least two magnets; and the rectangular frame body

540 of the main body portion 54 is formed with an accommodating space to accommodate the magnet module 55, the conductive module 56 and the driving portion 58.

The cap body 59 is locked to the main body portion 54 by screws. The cap body 59 is substantially flat plate-shaped and provided with openings 591 at both ends; the magnet module 55 is accommodated in the accommodating space of the main body portion 54, protrudes from the opening 591 and is exposed to the cap body 59. In a preferred embodiment of the present disclosure, an outer surface of the cap body 59 that faces the adsorbing surface 1010 of the magnetically-adsorbed conductive track 1 is provided with a strip-shaped collocating portion 590 located outside the opening 591; at positions corresponding to the conductive terminals 561 of the conductive module 56, the collocating portion 590 is formed with a plurality of grooves 592 which are used as conductive terminal accommodating portions 592. The conductive terminal 561 of the conductive module 56 protrudes and extends beyond the surface of the collocating portion 590 of the cap body 59, to be electrically connected with the magnetically-adsorbed conductive track 1.

After the lighting fixture 5 is assembled to the magnetically-adsorbed conductive track 1 to form the electrical system 2000, the collocating portion 590 and the conductive terminal 561 jointly extend into the second space 125 of the magnetically-adsorbed conductive track 1; and the conductive terminal 561 further enters the first space 124 and is elastically abutted against the conductive portion 13 to form an electrical connection. In addition, the surface of the cap body 590 is attached to the adsorbing surface 1010 of the magnetically-adsorbed conductive track 1; and the magnet 55 adsorbs the magnetic element 11 behind the adsorbing surface 1010. The collocating portion 590, together with the conductive terminal 561, is assembled into the magnetically-adsorbed conductive track 1, which enhances a binding force of the magnetically-adsorbed conductive track 1 and the lighting fixture 5, ensures sufficiently small height and small thickness of the electrical system 2000, and achieves a simple structure.

Therefore, after the grid lamp 5 is assembled by adsorption to the magnetically-adsorbed conductive track 1 through the conductive terminal 561 and the magnet module 55, the lighting module 57 may emit light as needed, for example, in a controllable, dimmable, and color-adjustable manner, and may achieve angle adjustment relative to the adapting module 54. The convenient assembly mode greatly facilitates the use.

Referring to FIG. 49 to FIG. 61, the present disclosure provides a lighting fixture 6 according to a fourth embodiment. In the embodiment of the present disclosure, the lighting fixture 6 is a polarized line lamp, particularly, a wall washer lamp. The lighting fixture 6 and the magnetically-adsorbed conductive track 1 constitute an electrical system 2000 according to the fourth embodiment of the present disclosure.

The lighting fixture 6 includes a main body 60 extending in a longitudinal direction, a cap body 62 formed by extending in the longitudinal direction and assembled to the main body 60, a light guide element 61 assembled to the main body 60 and the cap body 62, a magnet module 65, an electrical connection module 66, a lighting module 67 and an end cap 64 assembled to both ends of the main body 60 and the cap body 62.

The main body 60 includes a conductive track accommodating portion 601, a magnet module accommodating portion 602, a lighting module accommodating portion 603, a light guide element accommodating portion 604, a cap body accommodating portion 605 and an electrical connection module accommodating portion 606.

The main body 60 includes an inverted U-shaped frame body 607 which delimits the above-described magnet module accommodating portion 602; and the U-shaped frame body 607 includes a base portion 6070 and a pair of side walls 6071 formed by extending perpendicularly from two ends of a surface of the base portion 6070. An L-shaped side wall 6072 is formed by firstly extending perpendicularly from a free end of the side wall 6071 and then extending horizontally; the L-shaped side wall 6072 has an opening towards the outside, and forms the above-described conductive track accommodating portion 601 between a vertical portion and a horizontal portion of the L-shaped side wall 6072, so the conductive track accommodating portion 601 is U-shaped and in communication with the magnet module accommodating portion 602 enclosed by the U-shaped frame body 607. Two end edges of the other surface of the base portion 6070 protrude and extend to form a bent portion 6073; and a lighting module accommodating portion 603 having an opening towards the outside is formed between the bent portion 6073 and the base portion 6070. A wedge-shaped extending portion 6074 is raised from the vicinity of the base portion 6070 and has a bottom wall connected with the L-shaped side wall 6072; and the wedge-shaped extending portion 6074 is formed with the above-described light guide element accommodating portion 604 and has a hollowed configuration, thereby reducing the weight and increasing the strength. An L-shaped cap body accommodating portion 605 is formed between the L-shaped side wall 6072 and the side wall 6071. A rear portion of the body 60 is partially removed to form the electrical connection module accommodating portion 606.

The cap body 62 is substantially L-shaped, and includes a first cap body 621 accommodated in the cap body accommodating portion 605 and a second cap body 622 formed by vertically extending from the first cap body 621. The first cap body 621 is hollowed and has a protruding and extending portion 6210 which is in an interference fit with an interference portion 6075 formed by protruding and extending from a surface of the L-shaped side wall 6072 that faces the first cap body 621. The second cap body 622 partially covers an outer side of the lighting module accommodating portion 603, that is, the outer side of the lighting module 67, and has a U-shaped engagement portion 6220 formed at a free end thereof. The first cap body 621 is also locked with the L-shaped side wall 6072 of the main body 60 by screws.

The lighting module 67 includes a strip-shaped light source substrate 670, and a plurality of light sources 671 arranged on the surface of the light source substrate 670 and adjacent to one end thereof. The lighting module 67 is inserted and accommodated in the lighting module accommodating portion 603.

The light guide element 61 is wedge-shaped and laid on the surface of the light guide element accommodating portion 604; the light guide element 61 includes a wedge-shaped main body portion 610, a light incident surface 611 on one side thereof, and a light emergent surface 612 having a certain angle with the light incident surface 611; and the light emergent surface 612 is a main surface of the main body portion 610 and faces the outside. The light incident surface 611 faces the light source 671 of the lighting module 67 and receives incident light from the light source 671; the incident light undergoes multiple times of total reflections in the wedge-shaped main body portion 610 and exits from the light emergent surface 612. In order to emit light uniformly, the surface of the light emergent surface 612 may be etched or formed with dots, or the light guide element 61 may be doped with particles of different concentrations therein, to achieve scattering and light emission.

The magnet module 65 includes a plurality of groups of magnets 650 and strip-shaped fixing portions 651 arranged at intervals; the magnets 650 and the fixing portions 651 are arranged, in a strip shape, at intervals and are assembled through the magnet module accommodating portion 602, so that at least one surface of the magnet module 65 faces the conductive track accommodating portion 601.

The end cap 64 has a triangular shape, and includes a main body portion 640, extending portions 641 formed by respectively extending from both ends of the main body portion 640, and a plurality of engagement portions 642 arranged on a surface of the main body portion 640 and facing the main body 60. The end cap 64 is assembled to both ends of the main body 60 by an engagement of the engagement portion 642 and the main body 60; the extending portion 641 is flush with a surface of the L-shaped side wall 6072; and a space between the extending portions 641 is used for accommodating the end portion 14 of the magnetically-adsorbed conductive track 1.

The electrical connection module 66 includes a housing body 660 and an electrical connector 663 accommodated in the housing body 660. The housing body 660 includes a first housing body 661 and a second housing body 662 collocated with each other; and the electrical connector 663 is sandwiched between the first housing body 661 and the second housing body 662.

The electrical connector 663 includes a base body 6630, a first conductive terminal 6631 provided on one surface of the base body 6630 and formed by extending vertically from the base body 6630, and a second conductive terminal 6632 provided on the other surface of the base body 6630 and formed by extending vertically from the base body 6630. The first conductive terminal 6631 is an elastic pin-like conductive terminal and is electrically connected with the circuit inside the base body 6630. The second conductive terminal 6632 is an elastic element, preferably a spring; and the base body 6630 is provided with an opening to accommodate the second conductive terminal 6632 and is electrically connected with the second conductive terminal 6632.

The first housing body 661 includes a bottom wall 6610 and a side wall 6611 formed by extending from the bottom wall 6610. A middle portion of the side wall 6611 is provided with a first engagement portion 6612, which is a snap-fitting portion. The bottom wall 6610 is provided with a second engagement portion 6614 and a terminal accommodating portion 6613, respectively; in the embodiment of the present disclosure, the second engagement portion 6614 is an opening; and the terminal accommodating portion 6613 is a circular opening for the second conductive terminal 6632 to run therethrough and then extend beyond the bottom wall 6610 of the first housing body 661.

The second housing body 662 includes a bottom wall 6620 and a side wall 6621 formed by extending from the bottom wall 6620. A middle portion of the side wall 6621 is provided with a first engagement portion 6622, which is a hooker. The first engagement portion 6622 is connected with the first engagement portion 6612 of the first housing body 661 in a snap-fitting manner; in other embodiments, structures of these two may be interchanged. The bottom wall 6620 is provided with a second engagement portion 6624 and a terminal accommodating portion 6623, respectively. In the embodiment of the present disclosure, the second engagement portion 6624 is an opening; and the terminal accommodating portion 6623 is a circular opening. In the embodiment of the present disclosure, the second engagement portion 6624 is a cylinder, which is used for forming an interference fit with the second engagement portion 6614 of the first housing body 661 and has a guiding effect. In other embodiments, the second engagement portions 6614 and 6624 are interchangeable. The terminal accommodating portion 6623 is a circular opening running through the bottom wall 6620. Both sides of the other surface of the bottom wall 6620 respectively extend to form strip-shaped collocating portions 6625, which are arranged at intervals in a row, with the first conductive terminals 6631; and the first conductive terminals 6631 extend beyond the collocating portions 6625.

The electrical connection module 66 is accommodated in the electrical connection module accommodating portion 606 of the above-described main body 60 and is locked to the main body 60 by screws. The second conductive terminal 6632 is abutted against a rear face of the light source substrate 670 of the lighting module 67 to achieve an electrical connection. The first conductive terminal 6631 protrudes and extends into the conductive track accommodating portion 601. After the lighting fixture 6 is assembled to the magnetically-adsorbed conductive track 1, the magnetically-adsorbed conductive track 1 is accommodated in the above-described conductive track accommodating portion 601, and the adsorbing surface 1010 thereof is attached to the bottom wall of the conductive track accommodating portion 601; and the L-shaped side wall 6072 and extending portions 641 of the end cap 64 are respectively attached to the side wall 103 of the magnetically-adsorbed conductive track 1. The first conductive terminal 6631 and the collocating portion 6625 are jointly assembled into the second space 125 of the insulating portion 12 of the magnetically-adsorbed conductive track 1; and the first conductive terminal 6631 continues to extend into the first space 124 and is elastically abutted against the conductive portion 13 provided in the first space 124, to form an electrical connection. The collocating portion 6625, together with the first conductive terminal 6631, is assembled to the magnetically-adsorbed conductive track 1, which enhances a binding force of the magnetically-adsorbed conductive track 1 and the lighting fixture 6, ensures sufficiently small height and small thickness of the electrical system 2000, and achieves a simple structure.

The magnetically-adsorbed conductive track 1, the adapter 2, the electrical apparatuses 3, 4, 5, 6, as well as the magnetically-adsorbed conductive track system 1000 and the electrical system 2000 constituted thereby as provided by the present disclosure have simple structures, effectively reduced heights, and are convenient for assembly.

The present disclosure provides a magnetically-adsorbed conductive track, an adapter, an electrical apparatus, and an electrical system.

According to the first aspect, it provides an electrical system, including: at least two magnetically-adsorbed conductive tracks, at least one electrical apparatus and at least one adapter; the at least one adapter cascades the at least two magnetically-adsorbed conductive tracks; the magnetically-adsorbed conductive track includes a main body portion extending along a length direction and having a flat shape, the main body portion includes: an adsorbing wall, a mounting wall arranged opposite to the adsorbing wall, a pair of side walls connecting the adsorbing wall and the mounting wall, and a pair of partition walls parallel to the side walls and located between the side walls; the side walls and the partition walls, respectively, together with the adsorbing wall and the mounting wall, form conductive grooves extending in the length direction and located at both sides, and form an accommodating space located between the conductive grooves; a slot is formed in a direction from the adsorbing wall towards the mounting wall and is in communication with the conductive grooves; a pair of insulating portions, each accommodated in the conductive groove and provided with an accommodating portion in communication with the slot of the adsorbing wall; a pair of conductive portions, each accommodated in the accommodating portion of the insulating portion; and a magnetic element, accommodated in the accommodating space and attached to the adsorbing wall; the insulating portion is attached inside the conductive groove; and the accommodating portion of the insulating portion includes: a first space for accommodating the conductive portion, and a second space which is in communication with the first space and is smaller than the first space, allowing a conductor of a lamp to enter the first space from the second space to be electrically connected with the conductive portion; the electrical apparatus includes: a main body formed by extending along a longitudinal direction, an electrical connection module collocated with the main body, and a magnet module; the electrical connection module includes: a housing body formed by extending along the longitudinal direction, an elastic conductive terminal accommodated in the housing body, and a collocating portion provided on a surface of the housing body that faces the magnetically-adsorbed conductive track and extending in the longitudinal direction; the elastic conductive terminal and the collocating portion are arranged longitudinally in a row; and the elastic conductive terminal extends beyond the collocating portion along a height direction; the elastic conductive terminal and the collocating portion are jointly collocated into the magnetically-adsorbed conductive track; the elastic conductive terminal of the electrical apparatus and the collocating portion are jointly collocated into the second space of the magnetically-adsorbed conductive track; and the elastic conductive terminal further extends into the first space and is elastically abutted against a surface of the conductive portion to form an electrical connection; the adapter includes: an insulating body, and a conductive terminal arranged in the insulating body and partially protruding and extending out of the insulating body; the conductive terminal has a flat sheet shape and includes: a base portion provided in the insulating body, and a docking portion protruding and extending out of the insulating body; the insulating body protrudes and extends at the docking portion adjacent to the conductive terminal to form a guiding portion spaced apart from the conductive terminal, and the insulating body is configured such that the guiding portion and the docking portion are jointly assembled into the at least two electrical apparatuses to achieve an electrical connection of the two electrical apparatuses.

According to the second aspect, it provides a magnetically-adsorbed conductive track system configured to be mounted on a surface of a mounting foundation, including an adapter and at least two magnetically-adsorbed conductive tracks; the adapter includes an insulating body, and a conductive terminal arranged in the insulating body and partially protruding and extending out of the insulating body; the conductive terminal has a flat sheet shape, and includes a base portion arranged in the insulating body and a docking portion protruding and extending out of the insulating body; the insulating body protrudes and extends at the docking portion adjacent to the conductive terminal to form a guiding portion spaced apart from the conductive terminal, and the insulating body is configured such that the guiding portion and the docking portion are jointly assembled into the at least two electrical apparatuses to achieve an electrical connection of the at least two electrical apparatuses; the magnetically-adsorbed conductive track includes a main body portion, the main body portion extends along a length direction and has a flat shape, and the main body portion includes an adsorbing wall, a mounting wall arranged opposite to the adsorbing wall, a pair of side walls connecting the adsorbing wall and the mounting wall, and a pair of partition walls parallel to the side walls and located between the side walls; the side walls and the partition walls, respectively, together with the adsorbing wall and the mounting wall, form conductive grooves extending in the length direction and located at both sides, and form an accommodating space located between the conductive grooves; a slot is formed in a direction from the adsorbing wall towards the mounting wall and is in communication with the conductive grooves; a pair of insulating portions, each accommodated in the conductive groove and provided with an accommodating portion in communication with the slot of the adsorbing wall; a pair of conductive portions, each accommodated in the accommodating portion of the insulating portion; and a magnetic element accommodated in the accommodating space and attached to the adsorbing wall; the magnetically-adsorbed conductive track includes a main body portion and end portions arranged at both ends of the main body portion; the main body portion is embedded with the conductive portion; the end portion is configured to be electrically connected with the conductive portion and the conductive terminal of the adapter at the same time, and to be mechanically connected with the main body portion of the magnetically-adsorbed conductive track and the adapter at the same time.

According to the third aspect, it provides a magnetically-adsorbed conductive track, configured to be assembled on a mounting foundation and be magnetically adsorbed to and electrically connected with an electrical apparatus, including: a main body portion, extending along a length direction and having a flat shape, and including an adsorbing wall, a mounting wall arranged opposite to the adsorbing wall, a pair of side walls connecting the adsorbing wall and the mounting wall, and a pair of partition walls parallel to the side walls and located between the side walls; the side walls and the partition walls, respectively, together with the adsorbing wall and the mounting wall, form conductive grooves extending in the length direction and located at both sides, and form an accommodating space located between the conductive grooves; a slot is formed in a direction from the adsorbing wall towards the mounting wall, and is in communication with the conductive grooves; a pair of insulating portions, each accommodated in the conductive groove and formed with an accommodating portion in communication with the slot of the adsorbing wall; a pair of conductive portions, each accommodated in the accommodating portion of the insulating portion; and a magnetic element, accommodated in the accommodating space and attached to the adsorbing wall.

According to the fourth aspect, it provides an adapter configured to at least cascade two electrical apparatuses, including an insulating body, and a conductive terminal arranged in the insulating body and partially protruding and extending out of the insulating body; wherein, the conductive terminal has a flat sheet shape, and includes a base portion provided in the insulating body and a docking portion protruding and extending out of the insulating body; the insulating body protrudes and extends at the docking portion adjacent to the conductive terminal to form a guiding portion spaced apart from the conductive terminal, and the insulating body is configured such that the guiding portion and the docking portion are jointly assembled into the at least two electrical apparatuses to achieve an electrical connection of the two electrical apparatuses.

According to the fifth aspect, it provides an electrical apparatus magnetically adsorbable to a magnetically-adsorbed conductive track, including: a main body formed by extending along a longitudinal direction, an electrical connection module collocated with the main body, and a magnet module; the electrical connection module includes a housing body formed by extending along the longitudinal direction, an elastic conductive terminal accommodated in the housing body, and a collocating portion provided on a surface of the housing body that faces the magnetically-adsorbed conductive track and extending in the longitudinal direction; the elastic conductive terminal and the collocating portion are arranged longitudinally in a row; and the elastic conductive terminal extends beyond the collocating portion along a height direction; the elastic conductive terminal and the collocating portion are jointly collocated to enter the magnetically-adsorbed conductive track.

In addition, the electrical apparatuses may also be lighting fixtures such as down lamps, spot lamps, dining chandeliers, and ceiling lamps.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms “module,” “sub-module,” “circuit,” “sub-circuit,” “circuitry,” “sub-circuitry,” “unit,” or “sub-unit” may include memory (shared, dedicated, or group) that stores code or instructions that can be executed by one or more processors. The module refers herein may include one or more circuit with or without stored code or instructions. The module or circuit may include one or more components that are connected.

The above embodiments of the present disclosure are only focused on describing differences between the respective embodiments, different optimized features of the respective embodiments may be combined to form a more preferred embodiment as long as there is no contradiction, and the embodiments formed by combination will not be described separately herein in consideration of text conciseness.

The previous descriptions are only embodiments the present disclosure, and are not intended to limit the present disclosure. Those skilled in the art may make various modifications and changes to the present disclosure. Any modification, equivalent replacement, or improvement made without departing from the spirit and principle of the present disclosure shall fall within the scope of the present disclosure.

The invention claimed is:

1. An electrical system, comprising:

at least two magnetically-attracted conductive tracks, at least one electrical apparatus and at least one adapter, the at least one adapter cascading the at least two magnetically-attracted conductive tracks, wherein:

the magnetically-attracted conductive track comprises a main body portion extending along a length direction and having a flat shape, the main body portion comprises: an attraction wall, a mounting wall arranged opposite to the attraction wall, a pair of side walls connecting the attraction wall and the mounting wall, and a pair of partition walls parallel to the side walls and located between the side walls; the side walls and the partition walls, together with the attraction wall and the mounting wall, form conductive grooves extending in the length direction and located at both sides, and form an accommodating space located between the conductive grooves; a slot is formed in a direction from the attraction wall towards the mounting wall and is in communication with the conductive grooves;

a pair of insulating portions, each accommodated in the conductive groove and provided with an accommodating portion in communication with the slot of the attraction wall;

a pair of conductive portions, each accommodated in the accommodating portion of the insulating portion; and a magnetic element, accommodated in the accommodating space and attached to the attraction wall; wherein, the insulating portion is attached inside the conductive groove; and the accommodating portion of the insulating portion comprises: a first space for accommodating the conductive portion, and a second space which is in communication with the first space and is smaller than the first space, allowing a conductor of a lamp to enter the first space from the second space to be electrically connected with the conductive portion;

the electrical apparatus comprises: a main body formed by extending along a longitudinal direction, an electrical connection module collocated with the main body, and a magnet module;

the electrical connection module comprises: a housing body formed by extending along the longitudinal direction, an elastic conductive terminal accommodated in the housing body, and a collocating portion provided on a surface of the housing body that faces the magnetically-attracted conductive track and extending in the longitudinal direction; the elastic conductive terminal and the collocating portion are arranged longitudinally in a row; and the elastic conductive terminal extends beyond the collocating portion along a height direction;

the elastic conductive terminal and the collocating portion are jointly collocated into the magnetically-attracted conductive track;

the elastic conductive terminal of the electrical apparatus and the collocating portion are jointly collocated into the second space of the magnetically-attracted conductive track; and the elastic conductive terminal further extends into the first space and is elastically abutted against a surface of the conductive portion to form an electrical connection;

the adapter comprises: an insulating body, and a conductive terminal arranged in the insulating body and partially protruding and extending out of the insulating body; the conductive terminal has a flat sheet shape and comprises: a base portion provided in the insulating body, and a docking portion protruding and extending out of the insulating body; the insulating body protrudes and extends at the docking portion adjacent to the conductive terminal to form a guiding portion spaced apart from the conductive terminal, and the insulating body is configured such that the guiding portion and the docking portion are jointly assembled into the at least two electrical apparatuses to achieve an electrical connection of the two electrical apparatuses.

2. The electrical system according to claim 1, wherein, the main body portion of the magnetically-attracted conductive track comprises: a pair of side walls connecting the attraction wall and the mounting wall, and a pair of partition walls parallel to the side walls and located between the side walls; the side walls and the partition walls, together with the attraction wall and the mounting wall, form conductive grooves extending in the length direction and located at both sides, and form an accommodating space located between the conductive grooves; the insulating portion is arranged in the conductive grooves; and the magnetic element is accommodated in the accommodating space and attached to the attraction wall.

3. The electrical system according to claim 1, wherein, the magnetically-attracted conductive track further comprises a pair of end portions arranged at both ends of the main body portion, wherein the end portion is electrically connected with the conductive portion.

4. The electrical system according to claim 1, comprising at least two magnetically-attracted conductive tracks, at least one electrical apparatus and at least one adapter; wherein the adapter cascades the at least two magnetically-attracted conductive tracks.

5. The electrical system according to claim 4, wherein, the adapter comprises an insulating body and a conductive terminal arranged in the insulating body; the conductive terminal comprises a base portion arranged in the insulating body and a docking portion extending beyond the insulating body; the magnetically-attracted conductive track comprises end portions arranged at both ends of the main body portion; the end portion is configured to be electrically connected with the conductive portion and the conductive terminal of the adapter at the same time, and to be mechanically connected with the main body portion of the magnetically-attracted conductive track and the adapter at the same time.

6. A magnetically-attracted conductive track system configured to be mounted on a surface of a mounting foundation, comprising an adapter and at least two magnetically-attracted conductive tracks; wherein, the adapter comprises an insulating body, and a conductive terminal arranged in the insulating body and partially protruding and extending out of the insulating body; the conductive terminal has a flat sheet shape, and comprises a base portion arranged in the insulating body and a docking portion protruding and extending out of the insulating body; the insulating body protrudes and extends at the docking portion adjacent to the conductive terminal to form a guiding portion spaced apart from the conductive terminal, and the insulating body is configured such that the guiding portion and the docking portion are jointly assembled into the at least two electrical apparatuses to achieve an electrical connection of the at least two electrical apparatuses;

the magnetically-attracted conductive track comprises a main body portion, the main body portion extends along a length direction and has a flat shape, and the main body portion comprises an attraction wall, a mounting wall arranged opposite to the attraction wall, a pair of side walls connecting the attraction wall and the mounting wall, and a pair of partition walls parallel to the side walls and located between the side walls; the side walls and the partition walls, respectively, together with the attraction wall and the mounting wall, form conductive grooves extending in the length direction and located at both sides, and form an accommodating space located between the conductive grooves; a slot is formed in a direction from the attraction wall towards the mounting wall and is in communication with the conductive grooves;

a pair of insulating portions, each accommodated in the conductive groove and provided with an accommodating portion in communication with the slot of the attraction wall;

a pair of conductive portions, each accommodated in the accommodating portion of the insulating portion; and a magnetic element accommodated in the accommodating space and attached to the attraction wall; wherein the magnetically-attracted conductive track comprises a main body portion and end portions arranged at both ends of the main body portion; the main body portion is embedded with the conductive portion; the end portion is configured to be electrically connected with the conductive portion and the conductive terminal of the adapter at the same time, and to be mechanically connected with the main body portion of the magnetically-attracted conductive track and the adapter at the same time.

7. The magnetically-attracted conductive track system according to claim 6, wherein, the end portion comprises an insulating body and a conductive terminal arranged in the insulating body; both ends of the conductive portion extend beyond two end faces of the main body portion and extend into the end portion, to be electrically connected with the conductive terminal.

8. The magnetically-attracted conductive track system according to claim 7, wherein, the conductive terminal of the end portion comprises: abase portion located in a vertical plane, as well as a first docking portion and a second docking portion formed by extending from the base portion in a length direction towards opposite directions; the first docking portion is electrically connected with the conductive portion; and the second docking portion is electrically connected with the conductive terminal of the adapter.

9. The magnetically-attracted conductive track system according to claim 7, wherein, the insulating body of the end portion comprises a first surface and a second surface arranged opposite to each other, as well as a first end face and a second end face arranged opposite to each other; a pair of conductive plug portions arranged in a horizontal direction and a positioning plug portion located between the conductive plug portions are formed by extending from the first end face in the length direction; the conductive portion enters the end portion from the conductive plug portion and is electrically connected with the conductive terminal; and the positioning plug portion enters the accommodating space and is abutted against the magnetic element.

10. The magnetically-attracted conductive track system according to claim 6, wherein, the magnetically-attracted conductive track system is located in a same plane, and comprises at least two magnetically-attracted conductive tracks and at least one adapter; after an end portion, a main body portion and at least one adapter of different magnetically-attracted conductive tracks are embedded and collocated with each other, outer surfaces of the end portion, the main body portion and the at least one adapter are flush with each other.

11. The magnetically-attracted conductive track system according to claim 6, wherein, the magnetically-attracted conductive track system is located in different planes, and comprises at least two magnetically-attracted conductive tracks and at least one adapter; the adapter is L-shaped; after parts of an end portion, a main body portion and at least one adapter of one of the magnetically-attracted conductive tracks are embedded and collocated with each other, surfaces of the end portion, the main body portion and the at least one adapter that at least face the surface of the mounting foundation are flush with each other and are attached to the mounting foundation; after other parts of an end portion, a main body portion and at least one adapter of the other one of the magnetically-attracted conductive tracks are embedded and collocated with each other, surfaces of the end portion, the main body portion and the at least one adapter that at least face the surface of the mounting foundation are flush with each other and are attached to the mounting foundation.

12. The magnetically-attracted conductive track system according to claim 11, wherein, the insulating body of the adapter protrudes and extends at the docking portion adjacent to the conductive terminal to form a guiding portion spaced apart from the conductive terminal; the guiding portion and the docking portion are jointly assembled into the end portion to achieve an electrical and mechanical connection of the at least two magnetically-attracted conductive tracks.

13. A magnetically-attracted conductive track, configured to be assembled on a mounting foundation and be magnetically-attracted to and electrically connected with an electrical apparatus, comprising:

a main body portion, extending along a length direction and having a flat shape, and comprising an attraction wall, a mounting wall arranged opposite to the attraction wall, a pair of side walls connecting the attraction wall and the mounting wall, and a pair of partition walls parallel to the side walls and located between the side walls; wherein the side walls and the partition walls, together with the attraction wall and the mounting wall, form conductive grooves extending in the length direction and located at both sides, and form an accommodating space located between the conductive grooves; a slot is formed in a direction from the attraction wall towards the mounting wall, and is in communication with the conductive grooves;

a pair of insulating portions, each accommodated in the conductive groove and formed with an accommodating portion in communication with the slot of the attraction wall;

a pair of conductive portions, each accommodated in the accommodating portion of the insulating portion; and a magnetic element, accommodated in the accommodating space and attached to the attraction wall.

14. The magnetically-attracted conductive track according to claim 13, wherein, the conductive terminal comprises a base portion located in a vertical plane, as well as a first docking portion and a second docking portion formed by extending from the base portion in a length direction towards opposite directions; the first docking portion is electrically connected with the conductive portion; and the second docking portion is configured to form electrical connections with the adapter and magnetically-attracted conductive tracks.

15. The magnetically-attracted conductive track according to claim 13, wherein, the insulating portion is attached inside the conductive groove; and the accommodating portion of the insulating portion comprises a first space for accommodating the conductive portion and a second space which is in communication with the first space and is smaller than the first space, allowing a conductor of a lamp to enter the first space from the second space to be electrically connected with the conductive portion.

16. The magnetically-attracted conductive track according to claim 15, wherein, the insulating portion comprises a bottom wall and first side walls formed by extending from both sides of the bottom wall; the bottom wall and the first side walls delimit the first space; and the conductive portion is attached to the bottom wall and located between the first side walls.

17. The magnetically-attracted conductive track according to claim 13, further comprising a pair of end portions arranged at both ends of the main body portion, wherein the end portion is electrically connected with the conductive portion.

18. The magnetically-attracted conductive track according to claim 17, wherein, the end portion comprises an insulating body and a conductive terminal accommodated in the insulating body; and the conductive terminal is electrically connected with the conductive portion.

19. The magnetically-attracted conductive track according to claim 18, wherein, both ends of the conductive portion extend beyond two end faces of the main body portion and extend into the end portion, to be electrically connected with the conductive terminal.

20. The magnetically-attracted conductive track according to claim 18, wherein, the insulating body of the end portion comprises a first surface and a second surface arranged opposite to each other, as well as a first end face and a second end face arranged opposite to each other; a pair of conductive plug portions arranged in a horizontal direction and a positioning plug portion located between the conductive plug portions are formed by extending from the first end face in the length direction; the conductive portion enters the end portion from the conductive plug portion and is electrically connected with the conductive terminal; and the positioning plug portion enters the accommodating space and is abutted against the magnetic element.

* * * * *